(12) United States Patent
Thomson et al.

(10) Patent No.: US 9,513,390 B2
(45) Date of Patent: Dec. 6, 2016

(54) COMPENSATING FOR SPACE AND SLOWNESS/ANGLE BLURRING OF REFLECTIVITY

(71) Applicant: WESTERNGECO L.L.C., Houston, TX (US)

(72) Inventors: Colin Thomson, Cambridge (GB); Philip Kitchenside, Orpington (GB); Robin Fletcher, Guildford (GB)

(73) Assignee: WESTERNGECO L.L.C., Houston, TX (US)

( * ) Notice: Subject to any disclaimer, the term of this patent is extended or adjusted under 35 U.S.C. 154(b) by 218 days.

(21) Appl. No.: 14/531,510

(22) Filed: Nov. 3, 2014

(65) Prior Publication Data
US 2016/0125574 A1    May 5, 2016

(51) Int. Cl.
*G01V 1/28*    (2006.01)
*G01V 1/30*    (2006.01)
*G01V 1/36*    (2006.01)

(52) U.S. Cl.
CPC . *G01V 1/30* (2013.01); *G01V 1/36* (2013.01); *G01V 2210/67* (2013.01); *G01V 2210/679* (2013.01)

(58) Field of Classification Search
CPC ............ G06T 5/002; G01V 1/30; G01V 1/36; G01V 2210/67; G01V 2210/679
USPC ....................................................... 382/109
See application file for complete search history.

(56) References Cited

U.S. PATENT DOCUMENTS

| | | |
|---|---|---|
| 8,542,554 B2 | 9/2013 | Thomson et al. |
| 2003/0004649 A1 | 1/2003 | Khan |
| 2010/0183198 A1 | 7/2010 | Marmal et al. |
| 2011/0075516 A1 | 3/2011 | Xia et al. |
| 2013/0142009 A1 | 6/2013 | Chang et al. |
| 2013/0185032 A1 | 7/2013 | Archer et al. |

OTHER PUBLICATIONS

Chapman, "A new method for computing synthetic seismograms", Geophysical Journal of the Royal Astronomical Society, vol. 54, No. 3, Sep. 1978, pp. 481-518.
De Bruin, et al., "Angle-dependent reflectivity by means of prestack migration", Geophysics, vol. 55, No. 9, 1990, pp. 1223-1234.
Fletcher, et al., "Inversion after depth imaging", SEG Annual Meeting Expanded Abstracts, 2012, 5 pages.
Gelius, et al., "Analysis of the resolution function in seismic prestack depth imaging", Geophysical Prospecting, vol. 50, No. 5, Sep. 2002, pp. 505-515.
Gelius, "Diffraction-limited imaging and beyond—the concept of superresolution", Geophysical Prospecting, vol. 59, Issue 3, May 2011, pp. 400-421.

(Continued)

*Primary Examiner* — Daniel L Murphy
(74) *Attorney, Agent, or Firm* — Abimbola Bukoye

(57) ABSTRACT

Systems and methods for compensating for spatial and slowness or angle blurring of plane-wave reflection coefficients in imaging. A wave field may be determined at a reference depth proximate to a reflector for a shot record. A receiver-side blurring function may be determined at the reference depth. An aggregate blurring function may be constructed based at least partially on the source wave field and the receiver-side blurring function. A plane-wave reflection coefficients may be determined based at least partially on the aggregate blurring function.

20 Claims, 16 Drawing Sheets

(56) References Cited

OTHER PUBLICATIONS

Gelius, et al., "The resolution function in linearized Born and Kirchhoff inversion", Methods and Applications of Inversion, Lecture Notes in Earth Sciences, vol. 92, 2000, pp. 129-141.
Nemeth, et al., "Least-squares migration of incomplete reflection data", Geophysics, vol. 64, No. 1, 1999, pp. 208-221.
Schuster, et al., "Green's function for migration: Continuous recording geometry", Geophysics, vol. 65, No. 1, 2000, pp. 167-175.
Schuster, et al., "Least-squares crosswell migration", SEG-1993-0110, Society of Exploration Geophysicists, SEG Annual Meeting, Washington, DC, Sep. 26-30, 1993, 4 pages.
Simonetti, et al., "Multiple scattering: The key to unravel the subwavelength world from the far-field pattern of scattered waves", Physical Review E, vol. 73, Mar. 24, 2006, 13 pages.
Symes, "Migration velocity analysis and waveform inversion", Geophysical Prospecting, vol. 56, Issue 6, Nov. 2008, pp. 765-790.
Thomson, "On the form of the space-time domain reflection function for a simple flat-lying interface", Geophysical Prospecting, vol. 60, Issue 1, Jan. 2012, pp. 49-63.
Thomson, "The form of the reflection operator and extended image gathers for a dipping plane reflector in two space dimensions", Geophysical Prospecting, vol. 60, Issue 1, Jan. 2012, pp. 64-92.
Wapenaar, "One-way representations of seismic data", Geophysical Journal International, vol. 127, No. 1, 1996, pp. 178-188.
Wapenaar, "Reciprocity theorems for one-way wavefields", Geophysical Journal International, vol. 127, Issue 1, Oct. 1996, pp. 169-177.
Xie, et al., "Wave-equation-based seismic illumination analysis", Geophysics, vol. 71, No. 5, Sep.-Oct. 2006, pp. S169-S177.
Xu, et al., "Inversion on Reflected Seismic Wave", SEG Technical Program Expanded Abstracts, 2012, 4 pages.
Yan, et al., Acquisition aperture correction in the angle domain toward true-reflection reverse time migration, Geophysics, vol. 79, No. 6, 2014, pp. S241-S250.
Zhang, et al., "A stable and practical implementation of least-squares reverse time migration", SEG Technical Program Expanded Abstracts, 2013, pp. 3716-3720.
International Search Report issued in related PCT application PCT/US2015/054134 on Nov. 25, 2015, 3 pages.
Written Opinion issued in related PCT application PCT/US2015/054134 on Nov. 25, 2015, 4 pages.

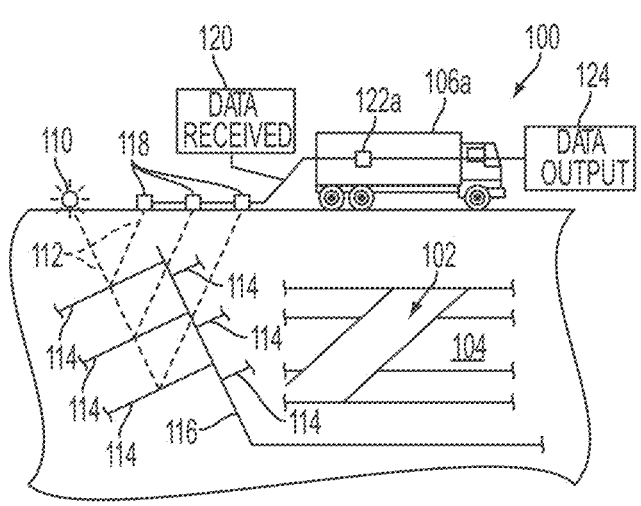
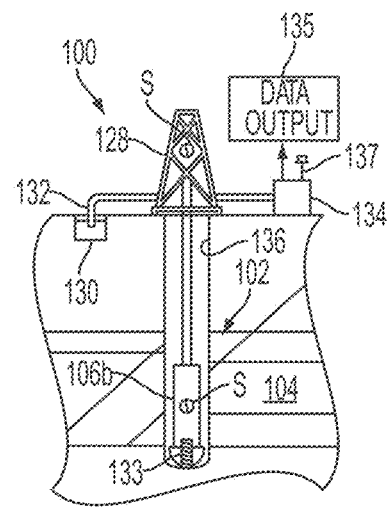
FIG. 1A
FIG. 1B
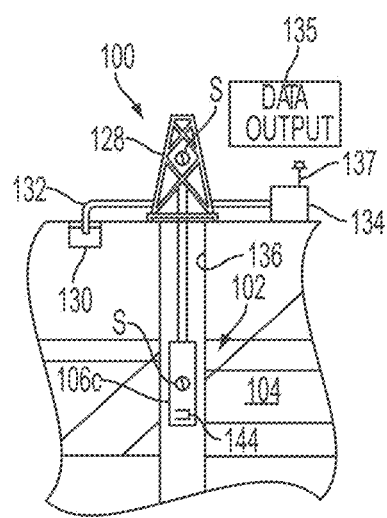
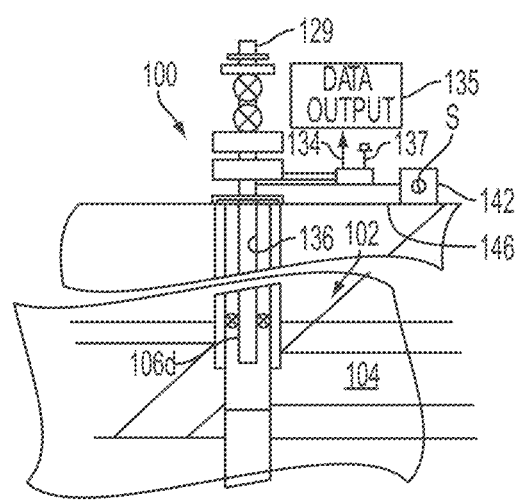
FIG. 1C
FIG. 1D

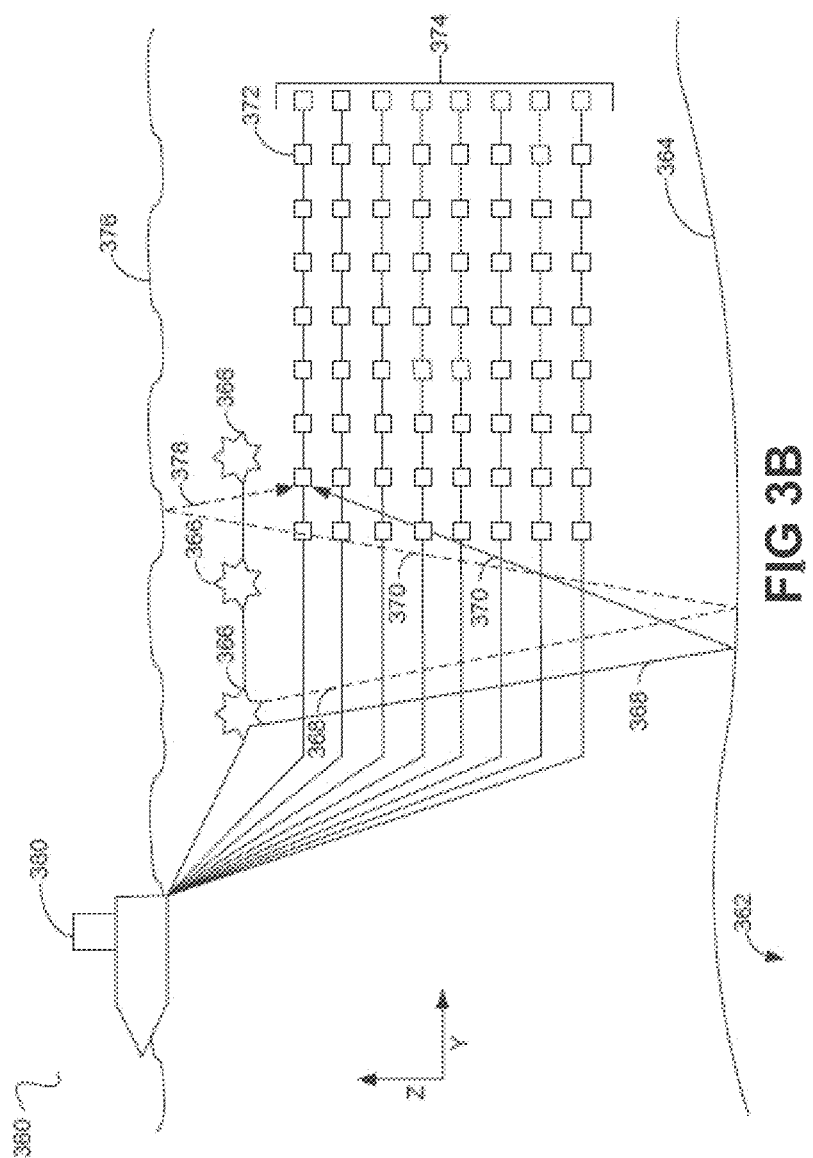

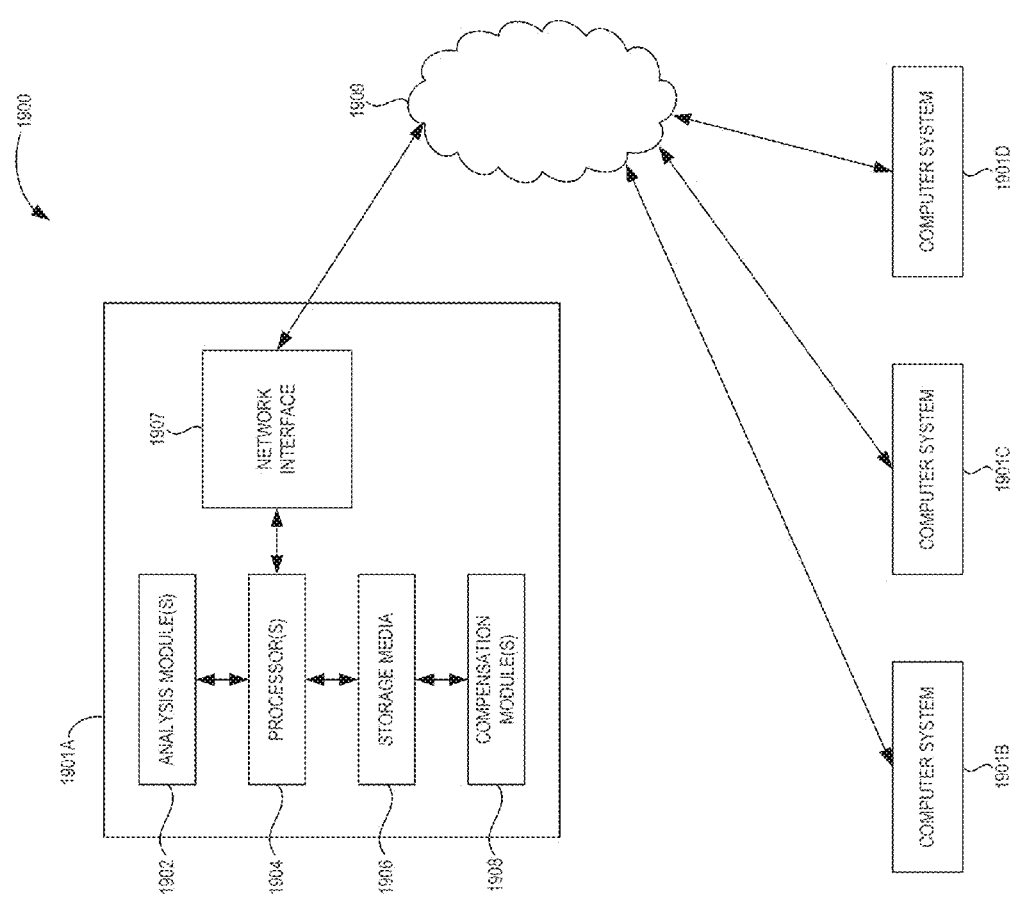

COMPENSATING FOR SPACE AND SLOWNESS/ANGLE BLURRING OF REFLECTIVITY

BACKGROUND

Seismic imaging may be used to delineate geological interfaces in a subsurface domain. Seismic imaging may begin with the acquisition of controlled-source reflection data (e.g., marine data). In areas where the subsurface is laterally homogeneous, the type of seismic imaging used may be referred to as "time imaging." In areas where the subsurface has greater complexity, the type of seismic imaging used may be referred to as "depth imaging."

In addition to delineating geological interfaces in the subsurface, the material property contrasts at the interfaces may be useful, in particular for interfaces at suspected oil and/or gas reservoirs. Amplitude versus offset or angle ("AVOA") may be used to estimate these property contrasts (e.g., in combination with time migration).

Applying AVOA may be a challenge for more complicated environments where depth imaging is used. For example, imaging below highly-refractive salt or basalt may be prone to illumination problems that may be quantified prior to AVOA inversion.

What is needed is an improved system, method, and resulting workflows for compensating for space and slowness/angle blurring of reflectivity.

SUMMARY

Embodiments of the disclosure may provide a method for compensating for spatial and slowness/angle blurring of plane-wave reflection coefficients in imaging. The method may include determining a source wave field at a reference depth proximate to a reflector for a shot record. A receiver-side blurring function may be determined at the reference depth. An aggregate blurring function may be determined based at least partially on the source wave field and the receiver-side blurring function. A plane-wave reflection coefficient may be determined based at least partially on the aggregate blurring function.

In an embodiment, the plane-wave reflection coefficient may further be based at least partially on an interaction of the aggregate blurring function with a reflection operator containing the plane-wave reflection coefficient.

In an embodiment, the plane-wave reflection coefficient may be determined based at least partially on the aggregate blurring function in a space-time domain at a fixed depth proximate to the reference depth.

In an embodiment, the plane-wave reflection coefficient may be determined in a domain of lateral position and depth at a fixed time.

In an embodiment, a calibrated extended image gather may be constructed proximate to the reference depth based at least partially on migration data and a calibration field including a band limit of the receiver-side blurring function.

In an embodiment, the reflector may be a dipping reflector with respect to a coordinate frame of the source wave field and the calibrated extended image gather.

In an embodiment, the calibrated extended image gather and the aggregate blurring function may be transformed to a space-frequency domain at a fixed depth. A reflection operator may be obtained in the space-frequency domain by matrix inversion.

In an embodiment, the reflection operator may be transformed from the space frequency domain into the plane-wave reflection coefficient by a Fourier transform.

In an embodiment, the aggregate blurring function may be transformed into a smearing function in a slowness or angle domain of the plane-wave reflection coefficient.

In an embodiment, the smearing function in the slowness or angle domain may be determined in a space-time domain at a fixed depth proximate to the reference depth.

In an embodiment, the smearing function in the slowness or angle domain may be determined in a domain of lateral position and depth at a fixed time.

In an embodiment, the calibrated extended image gather may be transformed into the slowness or angle domain. The plane-wave reflection coefficient may be determined based at least partially on the smearing function in the slowness or angle domain.

In an embodiment, the calibrated extended image gather in the smearing function may be obtained in the slowness or angle domain with a Radon transform or source-direction gathers.

In an embodiment, the aggregate blurring function, a rate of change in a shape of the aggregate blurring function, the one or more plane-wave reflection coefficients, or a combination thereof may be displayed.

In an embodiment, the shot record may be generated by a shot fired by a user on land or in a marine environment.

Embodiments of the disclosure may provide a non-transitory computer-readable medium storing instructions that, when executed by at least one processor of a computing system, cause the computing system to perform operations is disclosed. The operations may include determining a source wave field at a reference depth proximate to a reflector for a shot record. A receiver-side blurring functions may be determined at the reference depth. An aggregate blurring function may be constructed based at least partially on the source wave field and the receiver-side blurring function. A plane-wave reflection coefficient may be determined based at least partially on the aggregate blurring function.

Embodiments of the disclosure may provide a computing system including a processor and a memory system that includes a non-transitory, computer-readable medium including instructions that, when executed by at least one of the processor, cause the computing system to perform operations. The operations may include determining a source wave field at a reference depth proximate to a reflector for a shot record. A receiver-side blurring function may be determined at the reference depth. An aggregate blurring function may be constructed based at least partially on the source wave field and the receiver-side blurring function. A plane-wave reflection coefficient may be determined based at least partially on the aggregate blurring function.

Embodiments of the disclosure may provide a computing system including means for determining a source wave field at a reference depth proximate to a reflector for a shot record. The system also includes means for determining a receiver-side blurring function at the reference depth. The system also includes means for constructing an aggregate blurring function based at least partially on the source wave field and the receiver-side blurring function. The system also includes means for determining a plane-wave reflection coefficient based at least partially on the aggregate blurring function.

Embodiments of the disclosure may provide a computing system including a processor and a memory system that includes a non-transitory, computer-readable medium including instructions that, when executed by at least one of the processor, cause the computing system to determine a source wave field at a reference depth proximate to a reflector for a shot record. The instructions also cause the system to determine a receiver-side blurring function at the reference depth. The instructions also cause the system to construct an aggregate blurring function based at least partially on the source wave field and the receiver-side blurring function. The instructions also cause the system to determine a plane-wave reflection coefficient based at least partially on the aggregate blurring function.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 19 illustrates a computing system for implementing one or more of the methods disclosed herein, according to an embodiment.

DESCRIPTION OF EMBODIMENTS

Figure 2:
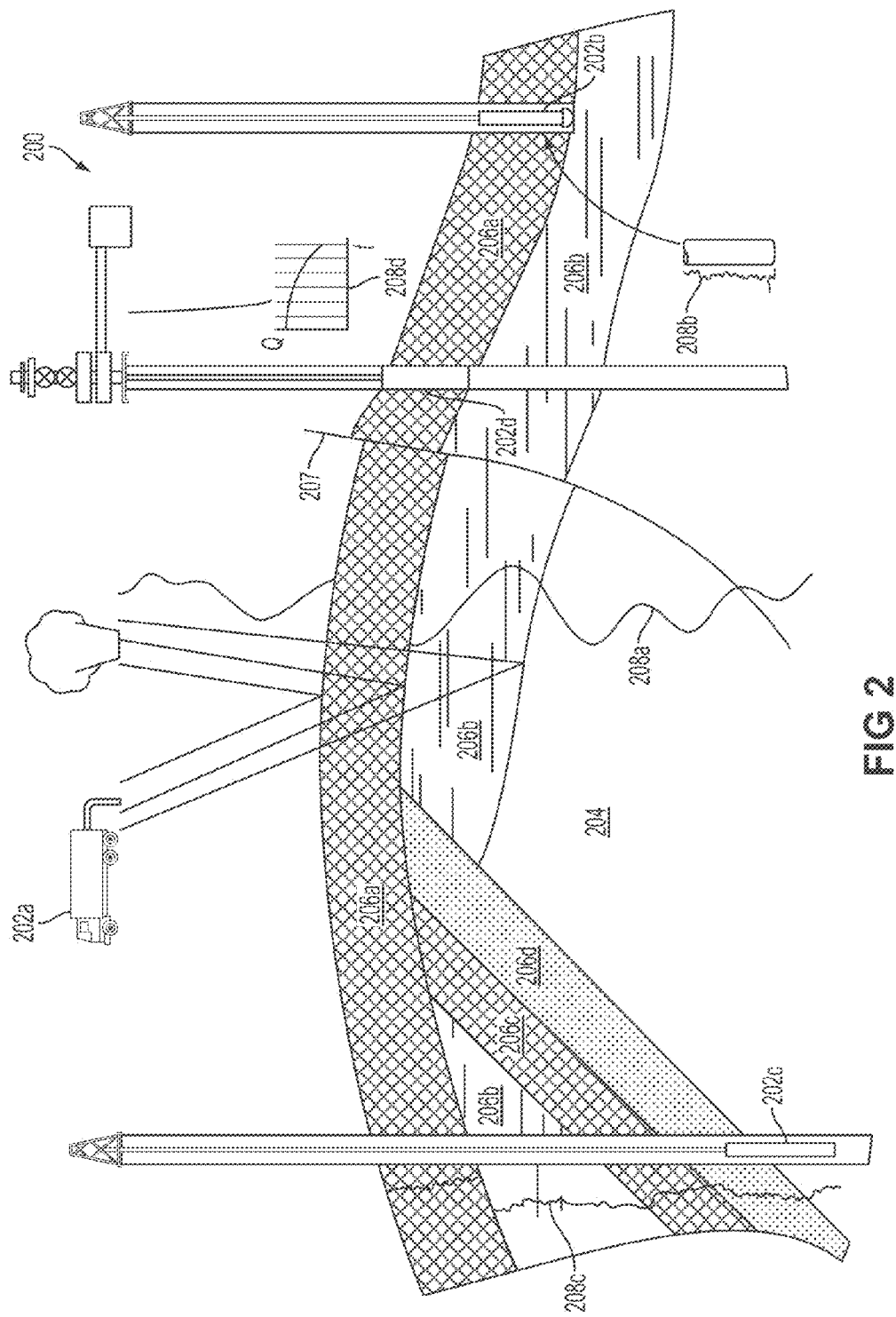

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may deviate from the drilling plan. Additionally, as drilling or other operations are performed, the subsurface conditions may change. The earth model may also adjust as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
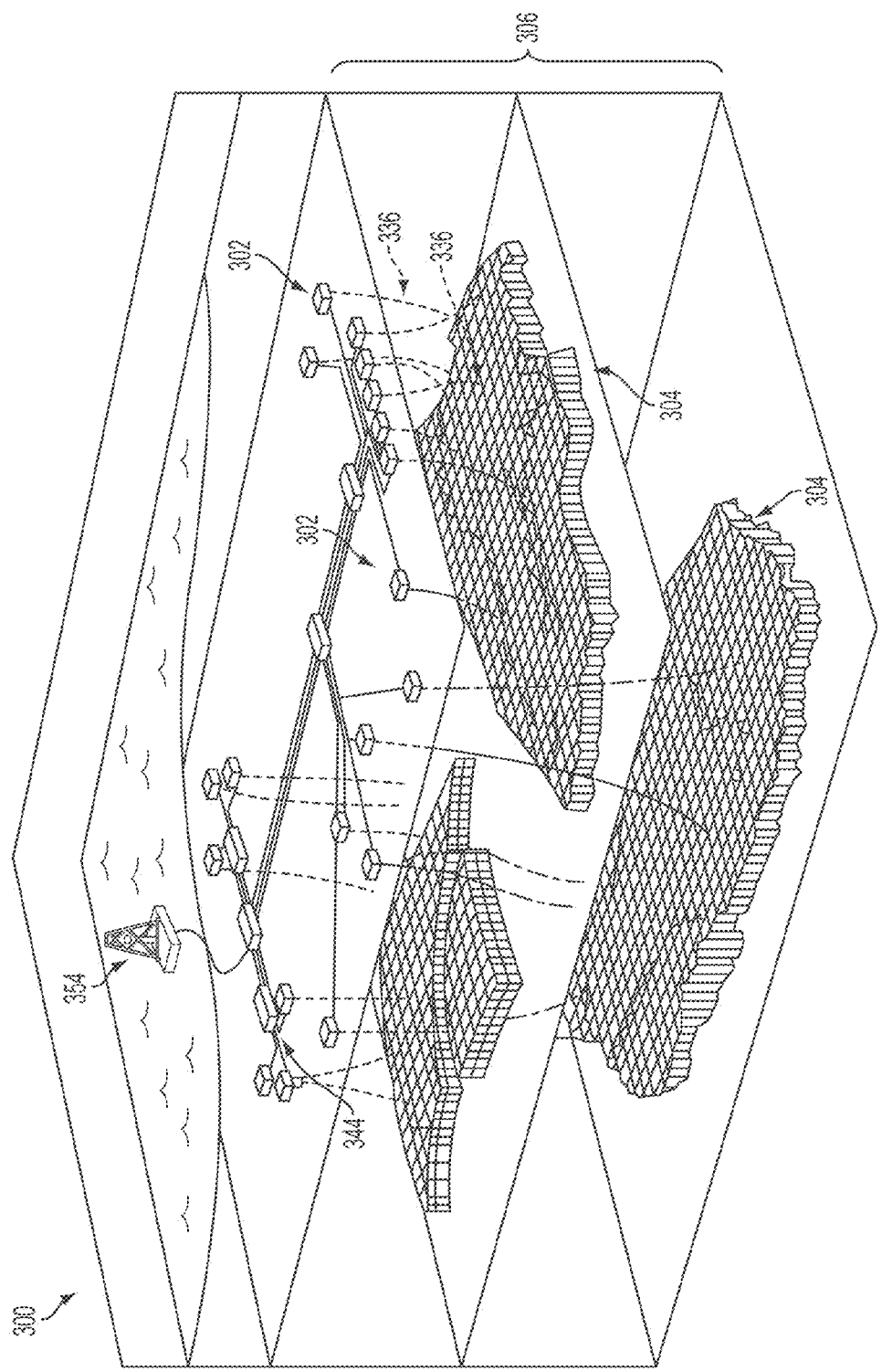

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. In another embodiment, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Typically, marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
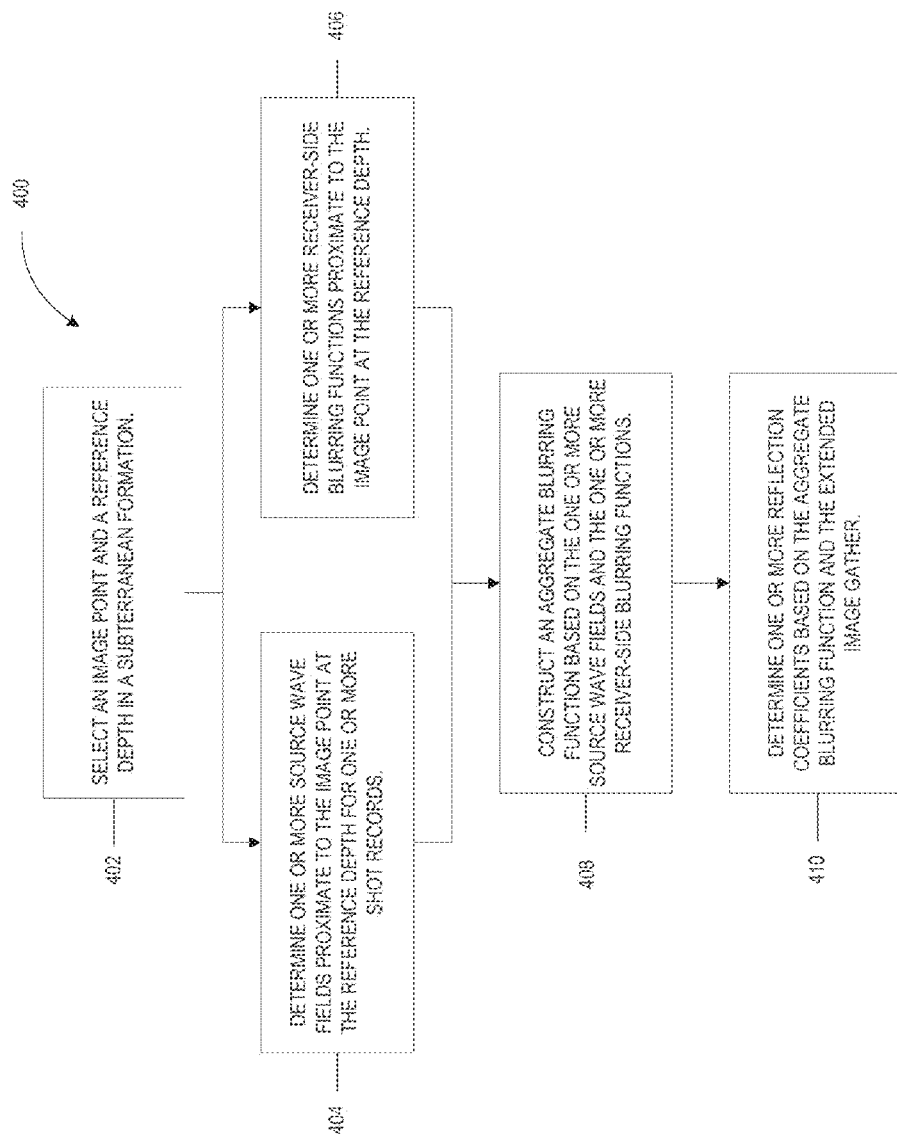
FIG. 4 illustrates a flowchart of a method for determining a reflection coefficient, according to an embodiment.

FIG. 4 illustrates a flowchart of a method 400 for determining a reflection coefficient, according to an embodiment. The method 400 may begin by selecting an image point x' and a reference depth $z_{ref}$ in a subterranean formation, as at 402. The reference depth may be just above a nearby reflector and/or may be at the actual reflector depth $z_R$ if it is a horizontal reflector. One or more source wave fields may be determined at the reference depth $z_{ref}$ for one or more shot records, as at 404. In addition, one or more receiver-side blurring functions may be determined at the reference depth $z_{ref}$, as at 406. An aggregate blurring function may be constructed based on (e.g., by combining) the one or more source wave fields and the one or more receiver-side blurring functions, as at 408. Once the last shot record has occurred, one or more reflection coefficients may be determined based on the aggregate blurring function, as at 410. During the process, the aggregate blurring function may be decomposed into plane-wave components, and it may be defined and used over a range of depths below the reference depth $z_{ref}$. Furthermore, one may use this function in either the time or frequency domain.

Figure 5:
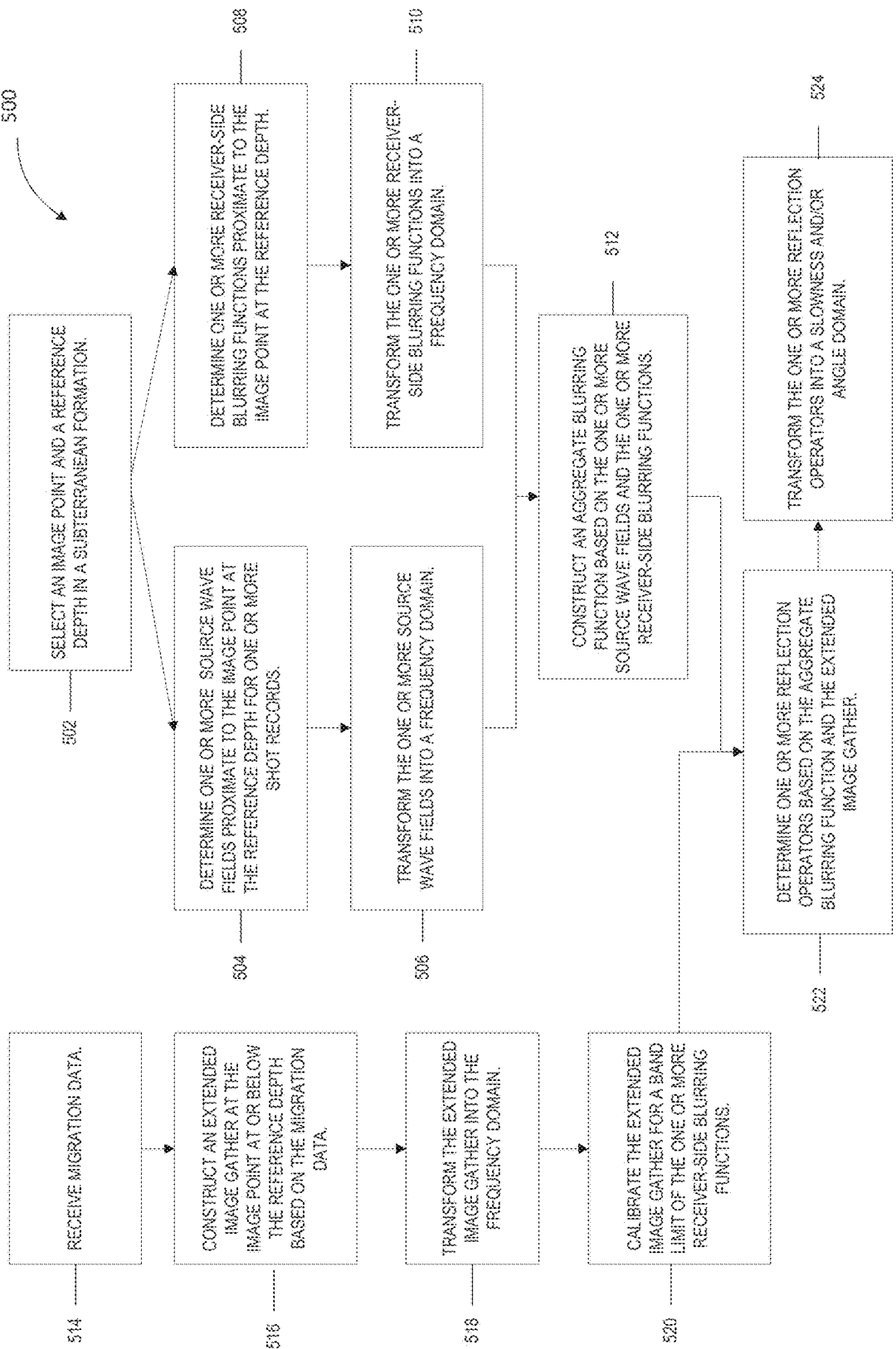
FIG. 5 illustrates another flowchart of a method for determining a reflection coefficient, according to an embodiment.

FIG. 5 illustrates a flowchart of a method 500 for determining a plane-wave reflection coefficient, according to an embodiment that uses the frequency-domain option for exploiting the aggregate blurring function. The method 500 may include selecting an image point x' and a reference depth $z_{ref}$ in a subterranean formation, as at 502. One or more source wave fields may be determined proximate to the image point x' at the reference depth $z_{ref}$ for one or more shot records, as at 504. The one or more shot records may be generated by one or more shots fired by a user. The shots may be fired on land or at sea. The source wave field may be a downgoing source wave field in the space-time domain (x,t). The source wave field may be transformed into the frequency domain, as at 506.

One or more receiver-side blurring functions may be determined proximate to the image point x' at the reference depth $z_{ref}$, as at 508. The receiver-side blurring functions may be in the space-time domain (x,t). The one or more receiver-side blurring functions may be transformed into the frequency domain, as at 510.

An aggregate blurring function may be constructed based at least in part on (e.g., by combining) the one or more source wave fields and the one or more receiver-side blurring functions, as at 512. The aggregate blurring function may be in the frequency domain if its components are in the frequency domain.

Migration data may be received, as at 514. In at least one embodiment, the migration data may be or include depth migration data obtained by reverse-time migration ("RTM") or any method that permits the formation of the subsurface extended image gathers referred to below. An extended image gather ("EIG") may be constructed at the reference depth $z_{ref}$ based at least in part on the migration data, as at 516. The extended image gather may be in the space-time domain (x,t). The extended image gather may be transformed into the frequency domain, as at 518.

The extended image gather may be calibrated for a band limit of the one or more receiver-side blurring functions, as at 520. The extended image gather may also be calibrated for a well-tie for source-side and receiver-side modelling uncertainty.

Once the last shot record has occurred, one or more reflection operators may be determined based at least in part on the aggregate blurring function and the calibrated extended image gather, as at 522. The one or more reflection operators may be in the space-frequency domain in this embodiment, e.g., if the extended image gather and aggregate blurring functions are in this domain.

The one or more reflection operators may be transformed into the slowness and/or angle domain to give plane-wave reflection coefficients, as at 524. The plane-wave reflection coefficients may be used as inputs to an AVOA analysis for material properties contrasts at the reflecting interface. These results may then be shown on a display (e.g., a monitor). For example, the aggregate blurring function may be displayed at various places to ascertain how wide and/or stable it is. A width of the blurring function in space may be used to determine the minimum length scale that may be resolved in space. Two small scatters separated by less than this distance may not be distinguished. A rate of change in a shape of the aggregate blurring function may determine how well the slowness/angle in the EIG may be resolved, meaning the plane-wave reflection coefficients "in" the EIG. In another embodiment, the EIG itself may be displayed to assess how prominent the reflector dip may be. The one or more plane-wave reflection coefficients may also be displayed to ascertain rock properties and the presence of hydrocarbons proximate to the reflector.

This method 500 may account for the laws of reflection and compensate for smearing of the plane-wave reflection coefficients in the slowness and/or angle domain as well as spatial-domain illumination and blurring.

Depth Imaging

Depth imaging may use a velocity model for the survey area. This model may be smoothly varying, but major refractive bodies such as salt may be explicitly contained if reflecting interfaces below these bodies.

The depth-migration technique may provide gridded estimates of the incident and reflected waves near the target interface and of the receiver-side blurring function. One such technique is called reverse-time migration ("RTM"), and it uses wave fields sampled on a grid in the migration velocity model. The gridded wave fields near the reflector may be obtained, for example, by a finite-difference or a ray-based extrapolation technique.

The incident-wave estimate at the interface may be obtained by extrapolation from the known source location in the migration velocity model. The reflected-wave estimate at the interface may be obtained by reverse-time extrapolation of the field recordings for the same shot, which may be fed into the model at the surface-receiver locations.

Extended Image Gather ("EIG")

Figure 6:
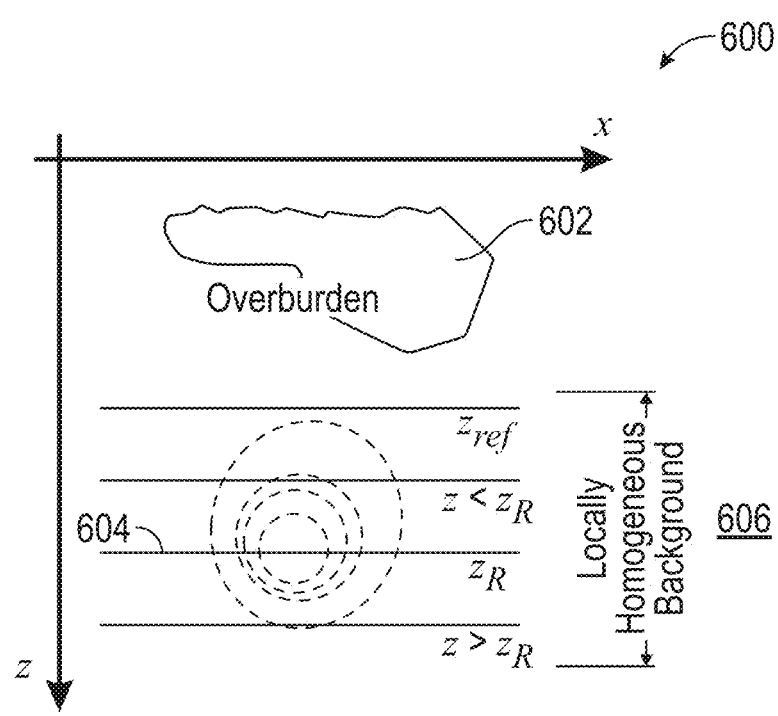
FIG. 6 illustrates a two-dimensional view of an overburden and a target interface, according to an embodiment.

FIG. 6 illustrates a two-dimensional view of an overburden 602 and a horizontal target interface 604, according to an embodiment. The overburden 602 and a locally homogeneous background 606 are shown near (e.g., above) the target interface 604. The dashed contours represent a space-domain blurring function.

Spatial coordinates (x,z) are used, plus time t. In the vicinity of the interface, the estimated incident wave is denoted by d(x,z,t), and the estimated reflected wave by ũ(x,z,t). The migration tool described above may be used to obtain the reflected-wave estimate ũ(x,z,t). The local form of the analytical back propagator defined below may also be involved.

The EIG denoted by I(x, x', z, t) and formed from these wavefields may be defined by $$I(x, x', z, t) = \sum_s \tilde{u}(x, z, t - t') d^{\dagger}(x', z, t'), \quad (1)$$

where superscript † denotes a time-reversed field, and summation is over shot index s. Integration with respect to time may be implicit on the right-hand side. The repeated variables may be integrated. Hence, the EIG may be a temporal correlation of the wavefields at spatially separated points x and x' at a given depth z.

The point (x', z) in the arguments of the EIG I(x, x', z, t) is called the image point, and it may be regarded as a constant for most of the following. The EIG I(x, x', z, t) may appear in the (x,t) plane at fixed z and x'. This (x,t) section may be called the subsurface "virtual-survey," because it relates closely to the reflection operator kernel, and the kernel may resemble the response due to a particular source placed just above the interface.

In another embodiment, I(x, x', z, t) may be in the (x,z) plane at a fixed output time, (e.g., t=0), and this embodiment is also considered below.

Mathematical Model of the EIG

Considering a flat reflector as a simple example let $z_R$ be the depth of the interface (see FIG. 6). The medium immediately above the interface may be locally homogeneous.

The interface reflection operator R(x,x', t) may connect an incident wave d(x', $z_R$, t) and the true upward-going wave u(x, $z_R$, t) at the reflector according to $$u(x,z_R,t)=R(x,x',t-t')d(x',z_R,t'), \quad (2)$$

where there is implicit integration over x' and t'. Note that x' in Equation (2) is a variable of integration and not the image-point argument x' in the EIG I(x, x', z, t). A single t is displayed for time (i.e., temporal convolutions are implicit, with the focus on spatial variables); however, the symbol '•' may be used instead of t, in order to increase further the spatial emphasis and to allow for frequency-domain representations.

A simplified mathematical expression for the space-time domain reflection operator at the interface is $$R(x, x', t) = -\frac{\dot{\bar{\delta}}(t)}{2\pi} * \int R(p)\delta(t - p(x - x'))dp, \quad (3)$$

where R(p) is a plane-wave reflection coefficient at slowness p, an overbar denotes a Hilbert transform, and a dot a time derivative. The plane-wave reflection coefficient R(p) may be considered as part of an AVOA analysis. Further, when estimating R(p) from an EIG, blurring in space and slowness/angle may be accounted for, as will be described below.

The availability of an accurate gridded incident wave d (x', z, t) may be assumed around the reflector for each shot. This may use forward-in-time modelling.

On the receiver side, the corresponding reflected wave u(x, $z_R$, t) at the interface may not be available. An estimate ũ(x,z,t) may be available, e.g., as obtained by back-propagation or reverse-time extrapolation of the field-data surface recordings.

The relation between these two types of reflected wave may be represented by $$\tilde{u}(x,z,t)=$$
$$W^{-(\dagger)}(x,z,x_r,z_r,t)a(x_r)W^-(x_r,z_r,x'',z_R,t)u(x'',z_R,t), \quad (4)$$

where $W^-(x_r, z_r, x'', z_R, t)$ is the upgoing-wave propagator from the reflector to the receiver level, $z_r$, a($x_r$) is a receiver aperture function of position $x_r$ at that level, and $W^{-(\dagger)}$(x, z, $x_r$, $z_r$, t) is the back propagator from the receiver level to the EIG level. The latter may be a reversed-wavepath operator rather than simply the time-reversed form of $W^-$, hence the superscript symbol (†). As explained below, the forward and backward wave propagators may be obtained by full wave equation modelling, and they contain overburden transmission losses as well as geometrical spreading. These may be surface to surface wave propagators, and they may be equivalent to true-amplitude transmission operators for the region between the target zone and the receivers. These basic propagators may contain internal multiples. Even more complicated wavepaths may be dealt with that encompass energy travelling deeper than the target for some portion of the wavepath. However, considering, as an example, the primary or direct wavepath from the surface to depth and vice versa, an appropriate space-time waveform windowing may be implicit.

From Equation (4), a receiver-side blurring function may be defined by $$B_r(x,z,x'',z_R,t)=W^{-(\dagger)}(x,z,x_r,z_r,t)a(x_r)W^-(x_r,z_r,x'',z_R,t). \quad (5)$$

$B_r$ is a function of two depths as well as two lateral variables, and time. Collecting together the above information, the model for EIG analysis may be written $$I(x,x',z,t) = \sum_s B_r(x,z,x'',z_R,t)R(x'',x''',t)d(x''',z_R,t)d^\dagger(x',z,t), \quad (6)$$

where on the left hand side, I(x, x', z, t) is a gridded data object given by Equation (1), and on the right hand side, R(x, x', t) is a mathematical model of the reflection operator containing plane-wave reflection coefficients according to Equation (3). There may be integration over the dummy variables x'' and x''' and/or time convolutions.

Changing the orders of integration and summation in Equation (6) may yield $$I(x,x',z,t)=\mathcal{B}(x,x',x'',x''',z,z_R,t)R(x'',x''',t), \quad (7)$$

where $$\mathcal{B}(x,x',x'',x''',z,z_R,t)=$$
$$\Sigma_s B_r(x,z,x'',z_R,t)d(x''',z_R,t)d^\dagger(x',z,t), \quad (8)$$

may be an "aggregate blurring function," which may contain at least some of the effects of the shots. The aggregate blurring function may also account for at least some of the effects of source-side illumination variations, as well as blurring due to back propagation of finite-aperture receiver data. $z_R$ may be implicit in the reflection operator, and there may be no integration over the repeated depth variables. There may be integration over the repeated lateral spatial variables and time. Also, the receiver-side blurring function $B_r$ may depend at least partially on the shot index s for a moving array such as a marine streamer.

The aggregate blurring function $\mathcal{B}$ (Equation (8)) may be considered a function of three lateral space coordinates: x, x'' and x''', as x' in the EIG I(x, x', z, t) may be considered a constant (e.g., the image point at which the reflectivity is to be found). The first coordinate x is the running coordinate of the EIG, and the other two are connected to the reflection operator.

The EIG on the left hand side of Equation (6) or (7) contains the source signature twice, once in the estimated incident wave $d^\dagger(x', z, t)$ and once in the back-propagated field data ũ(x,z,t). On the right hand side of these equations, the source signature again appears twice, in the source-side combination $d(x''', z_R, t)d^\dagger(x', z, t)$.

Thus, Equations (6) and (7) may be balanced with respect to the bandwidth of the source. At this point, the receiver-side blurring function $B_r$ (x, z, x'', $z_R$, t) may have infinite bandwidth, notwithstanding its use of a back propagator with a particular smoothing effect on evanescent waves. $B_r$ (x, z, x'', $z_R$, t) may be thought of as being singular like the generalized function that is the reflection operator in Equation (3). This operator may contain illumination effects, but as yet it may not have a frequency limitation.

Figure 7:
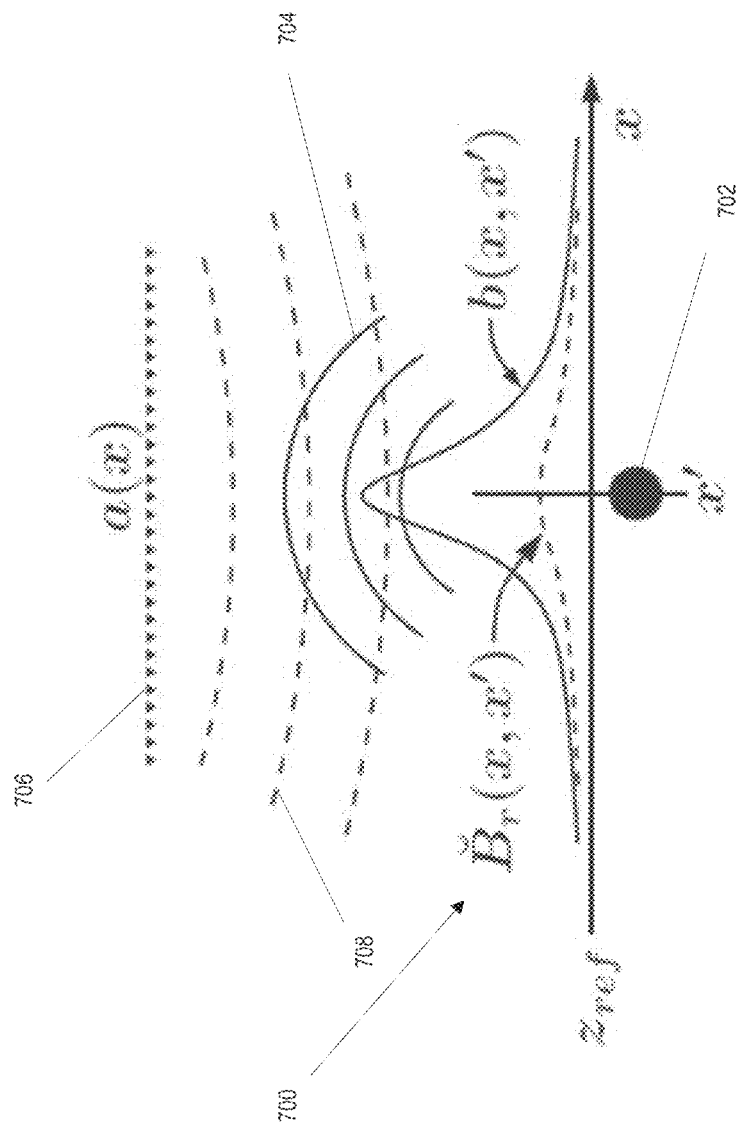
FIG. 7 illustrates a schematic view of a receiver-side blurring function, according to an embodiment.

Numerical Estimation of the Receiver-Side Blurring Function and the Calibration Field FIG. 7 illustrates a schematic view of a receiver-side blurring function 700, according to an embodiment. The receiver-side blurring function $B_r$(x, z, x'', $z_R$, t) of Equation (5) may be numerically estimated using the modelling engine for the given migration velocity model and acquisition geometry parameters. This may be done by injecting a small source 702 around or near the image point, so that x'' may now be taken to characterize the location of this injected source (note that x'' is denoted x' in FIG. 7). This injected source 702 may be bandlimited, and it may be controlled by the user independently of the field data in the EIG.

Another consideration is that the wave propagators in the receiver-side blurring function Equation (5) are surface-to-surface field-to-field operators. Referring to FIG. 7, let $z_{ref}$ be a reference depth or level just above the support of the finite source injection volume. Let the resulting injected (e.g., upgoing) wavefield 704 at $z_{ref}$ be denoted b(x, x', $z_{ref}$,t). This plays the role of a calibration field.

The injected wavefield 704 may be modeled up to a receiver array 706 and then reinjected as a downgoing wave 708. This downgoing wave 708 measured at the same level $z_{ref}$ may be an estimate of the smoothed blurring function for level $z_{ref}$ defined by $$\breve{B}_r(x,z_{ref},x',z_{ref},t)=B_r(x,z_{ref},x'',z_{ref},t)b(x'',x',z_{ref},t), \quad (9)$$

where a temporal convolution is also understood. This smoothed blurring function may be gridded and may be available for various values of x'. Further, x' is a local variable in this equation, and is not to be confused with the image-point argument x' in the EIG.

Equation (9) involves integration with respect to x'', the second spatial argument of $B_r$. This argument of $B_r$ may be composed with the first argument of the reflection operator in the EIG Equation (6) or (7). By exploiting a reciprocity property, it is possible to transfer the smoothing integration to the first argument of $B_r$. This facilitates the combination of the field-data-independent smoothing expressed by Equation (9) with the EIG formula Equation (6) or (7). This may be referred to as "matching of the bandwidths."

Reciprocity of the Receiver-Side Blurring Function

If the receiver-side blurring function had the following simple offset-only dependence $$B_r(x,z_{ref},x',z_{ref},t)=B_r(x-x',z_{ref},0,z_{ref},t), \quad (10)$$

then composition over x' would be equivalent to composition over x by a straightforward change of integration variables. In such a case, the position of b in Equation (9) may be moved to "the left of" $B_r$, and composition of the latter with R in Equation (6) or (7) may proceed as before.

Figure 8:
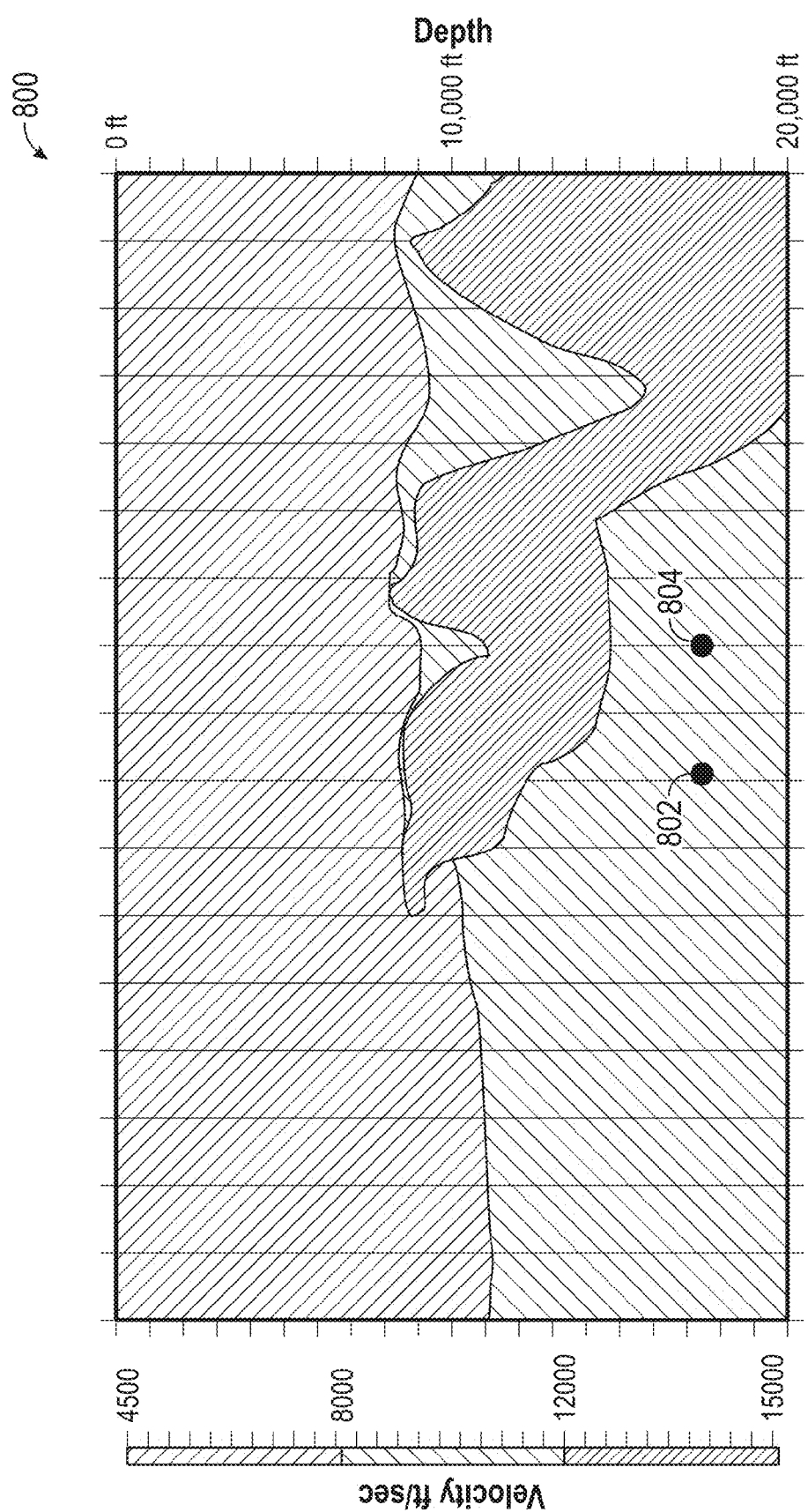
FIG. 8 illustrates a two-dimensional view of a subterranean model including first and second subsalt image points, according to an embodiment.
Figure 10:
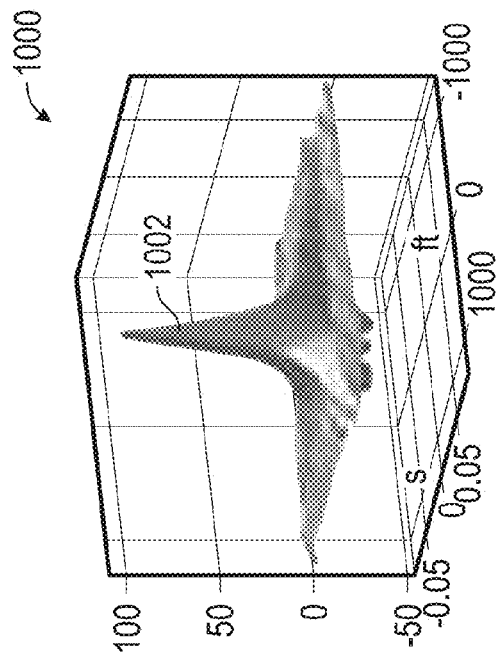
FIGS. 9 and 10 illustrate three-dimensional views of receiver-side blurring functions centered on the first and second image points shown in FIG. 8, respectively, according to an embodiment.
Figure 9:
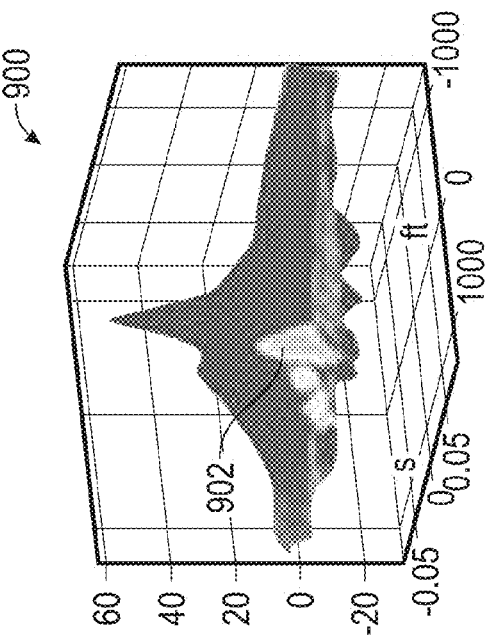

Some numerical examples, e.g., in the SIGSBEE model, indicate that offset-only dependence of the receiver-side blurring function may not be relied upon, although in others it may be. FIG. 8 illustrates a two-dimensional view of a subterranean model 800 including first (e.g., left) and second (e.g., right) subsalt image points 802, 804, according to an embodiment. FIGS. 9 and 10 illustrate three-dimensional views of receiver-side blurring functions 900, 1000 centered on the first and second image points 802, 804 shown in FIG.

8, respectively, according to an embodiment. As shown, the image points 802, 804 are separated by 7500 feet, which is greater than the width of the well-focused blurring-function spike 1002 in FIG. 10. The blurring function 1000 may be stable with respect to changes in its image point 804 location that are comparable to the width of its spike 1002, which is comparable to the radius of the point 804 in FIG. 8. In contrast, for the image point 802 on the left in FIG. 8, the spike 902 in the receiver-side blurring function 900 in FIG. 9 is not well-focused, and it changes its form when its image point 802 is perturbed by a distance comparable to the size of the point 802 (i.e., it is unstable).

Figure 12:
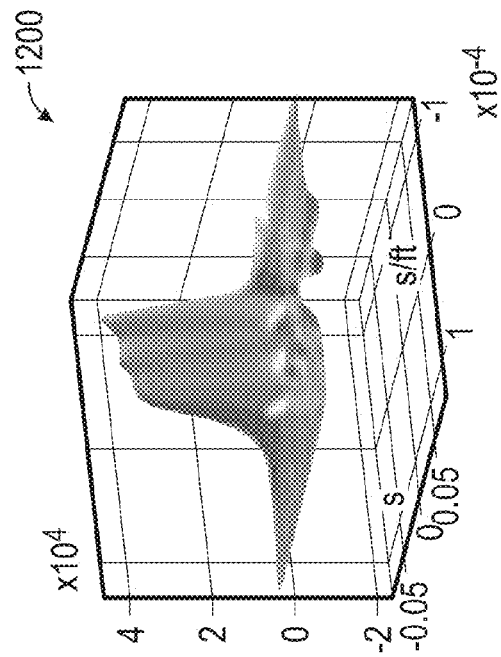
FIGS. 11 and 12 illustrate three-dimensional views of Radon transforms or slant stacks of the receiver-side blurring functions shown in FIGS. 9 and 10, respectively, according to an embodiment.
Figure 11:
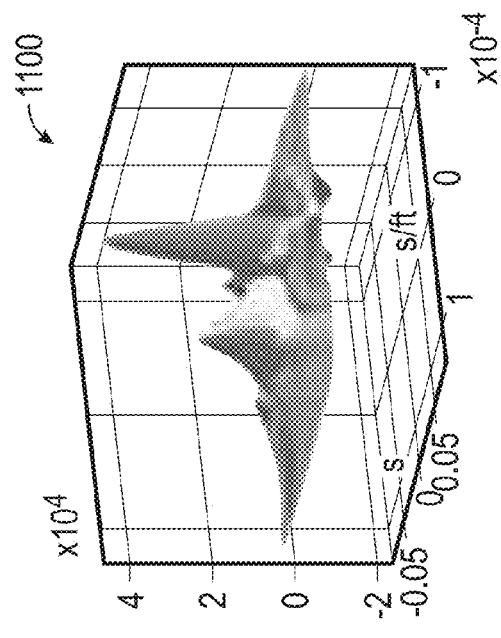

FIGS. 11 and 12 illustrate three-dimensional views of Radon transforms or slant stacks 1100, 1200 of the receiver-side blurring functions 900, 1000 shown in FIGS. 9 and 10, respectively, according to an embodiment. A blurring function may be considered stable if it is approximately offset-only dependent over a region comparable to the width of its central spike.

More generally, if the receiver-side blurring function had the reciprocity property $$B_r(x,z_{ref},x',z_{ref},t)=B_r(x',z_{ref},x,z_{ref},t), \quad (11)$$

then the repositioning of b in Equation (9) may again be achieved. Further, there may be a reciprocity property, of the form:

$$B_r(x,z_{ref},x',z_{ref},\bullet)=\mathcal{N}^{\dagger}(x,x'',\bullet)B_r^{[\dagger]\dagger}(x''',z_{ref},x'',z_{ref},\bullet)\mathcal{N}^{-1}(x''',x',\bullet), \quad (12)$$

where $\mathcal{N}$ is an operator related to the impedance operator for the locally homoegeneous medium around the target. Focusing on the spatial arguments in Equation (12), it may be seen that on the right hand side, x is associated via $\mathcal{N}^{\dagger}$ with x" in $B_r^{[\dagger]\dagger}$ (i.e., the second spatial argument of the latter). Similarly, on the right hand side, x' is associated via $\mathcal{N}$ with x''' in $B_r^{[\dagger]\dagger}$ (i.e. the first spatial argument of the latter). Thus, there is a reciprocity property. The complicated superscripts on $B_r^{[\dagger]\dagger}$ indicate time-reversal effects. Considering the blurring function for two different depths, rather than having $z_{ref}$ appear twice, then it may be apparent why the outer time-reversal superscript † appears. The other superscript symbol [†] is associated with wavefield up/down splitting operators at the receivers, the details of which are omitted here.

The impedance operator and the related operator $\mathcal{N}$ may be defined in the locally homogeneous medium. Therefore, these operators may, in an embodiment, depend on the offset, but in others may depend on the offset in addition to other factors.

Local Propagators and the Incident-Wave Composite Function

The fields at different z levels around the target may be related by the wave propagator for a locally homogeneous acoustic medium. Ignoring the local evanescent waves, these propagators may be represented by simplified plane-wave integrals such as:

$$W^{\pm}(x,z,x',z',t)=-\frac{\dot{\delta}(t)}{2\pi}*\int \delta(t-(\pm q(z-z')+p(x-x')))dp \quad (13)$$

with real vertical slowness q≥0 and z, z' chosen as appropriate for down-/up-going waves. There is a similar definition for the back propagators $W^{\pm(\dagger)}$.

An incident-wave composite field at the imaging depth z may be defined to be $$D(x,x',z,\bullet)=d(x,z,\bullet)d^{\dagger}(x',z,\bullet), \quad (14)$$

and then form the dual-depth combination $$d(x,z_R,\bullet)d^{\dagger}(x',z,\bullet)= W^{+}(x,z_R,x'',z_{ref},\bullet))W^{+\dagger}(x'',z_{ref},x''',z,\bullet)D(x''',x',z,\bullet). \quad (15)$$

Similarly, the receiver-side blurring function purely at $z_{ref}$ and the dual-depth version for (z, $z_R$) may be related according to:

$$B_r(x,z,x',z_R,\bullet)=W^{+\dagger}(x,z,x'',z_{ref},\bullet)B_r(x'',z_{ref},x''',z_{ref},\bullet)\times W^{-}(x''',z_{ref},x',z_R,\bullet). \quad (16)$$

In Equations (15) and (16), for scalar fields, the operators may be rearranged without the matrix transpositions. The order of integration may simply be changed. The local wave propagators may be functions of offset-only, like the local impedance operator and normal operator.

Bandwidth Matching and the Calibrated EIG

The calibrated EIG may be defined as the composition of the calibration function and the EIG according to:

$$\breve{I}(x,x',z,\bullet)=b^{\dagger}(x'',x,\bullet)I(x'',x',z,\bullet), \quad (17)$$

where the breve on $\breve{I}$ indicates the extra smoothing due to the inclusion of the bandwidth of b. This may be an example of bandwidth matching, as it establishes a commonality between the field data and the modelled receiver-side blurring function. The definition in Equation (17) involves integration over the first argument of b. The EIG function I is given by Equation (6) and $B_r$ by Equation (16). Noting the fact that b is also a function of offset-only in the locally homogeneous medium, it is possible to interchange the orders of b and $W^{+\dagger}$.

Next, as $B_r$ has the reciprocity property in Equation (12) and as the normal operator $\mathcal{N}$ is also a function of offset-only, it is possible to interchange the orders of b and $\mathcal{N}^{\dagger}$. This brings b into composition with $B_r^{[\dagger]\dagger}$ (x''', $z_{ref}$, x'', $z_{ref}$,•) shown in Equation (12) and, as noted there, it is the integration with respect to the second argument x" which arises in that composition.

This composition may correspond to the definition of the smooth function $$\breve{B}_r^{[\dagger]\dagger}(x''',z_{ref},x',z_{ref},\bullet)= B_r^{[\dagger]\dagger}(x''',z_{ref},x'',z_{ref},\bullet)b^{\dagger}(x'',x',z_{ref},\bullet), \quad (18)$$

which is the time-reversed form of the band-limited receiver-side blurring function at level $z_{ref}$ that is available from the numerical modelling. Thus, reciprocity of the blurring function may facilitate embedding the available smoothed function in Equation (18) into the EIG in Equation (6).

These calculations may make use of the operator plane-wave expansions, such as Equations (3) and (13), and a similar one for the impedance operator. These may include forward and backward Radon transforms.

A result of the calibrated EIG may be written in the explicit form:

$$\breve{I}(x,x',z,t)= \quad (19)$$

$$\frac{\dot{\delta}(t)*\dot{\delta}(t)}{(2\pi)^2}*\int\int R(p')i(p)i^{-1}(p')\times \sum_s \breve{B}^{[\dagger]\dagger}(-p',z_{ref},-p,z_{ref},$$

$$t+q'(z-z_R)-q'(z_R-z_{ref})+q(z-z_{ref})+px)*$$

$$\tilde{D}(p',z,x',t)dp dp',$$

where i(p)=ρ/2q is half the plane-wave impedance. A tilde in Equation (19) represents a Radon transform, which for the receiver-side blurring function, may be applied to both of its lateral arguments whereas for the incident-wave function it applies once. The fact that the same slowness p' appears in both functions is an expression of Snell's law and may be enforced by the form of the reflection operator.

The smoothed EIG of Equation (19) may be balanced with respect to the source wavelet of the field data, which appears twice on the far left and the far right. It may also be balanced with respect to the bandwidth or wavelet of the numerically estimated receiver-side blurring function, which appears once on the left and once on the right (in $\check{B}_r^{[\dagger]\dagger}$). Thus, this formula provides a consistent basis for AVOA.

Slant Stacking and the Plane-Wave Reflection Coefficient Smearing Function

As the p integral in Equation (19) is in the form of an inverse Radon transform, it may be seen that the slant stack of the EIG is in the form:

$$\tilde{I}(p, x', z, t) = \int S(p, p', x', z, z_R, t) R(p') dp' \qquad (20)$$

where $$S(p, p', x', z, z_R, t) = \qquad (21)$$

$$-i(p)i^{-1}(p')\frac{\dot{\delta}(t)}{2\pi} * \sum_s \tilde{B}^{[\dagger]\dagger}(-p', z_{ref}, -p, z_{ref},$$

$$t + q'(z - z_R) - q'(z_R - z_{ref}) + q(z - z_{ref})) * \tilde{D}(p', z, x', t)$$

is the plane-wave reflection coefficient smearing function in the slowness domain. This smearing function may be obtained from the aggregate blurring function and once found may be used to obtain the plane-wave reflection coefficient from the slant stack of the calibrated EIG via Equation (20). This is a type of deconvolution problem.

With a laterally homogeneous overburden and infinite shot and receiver apertures, the plane-wave reflection coefficient smearing function S in Equation (21) becomes proportional to the delta function δ(p-p'), and the slowness integral in Equation (20) collapses to a single reflection coefficient at slowness p.

A laterally homogeneous overburden and infinite shot and receiver apertures lead to receiver-side and aggregate blurring functions with offset-only dependence. These blurring functions are therefore precisely stable in the sense that their shapes do not change as the image point changes. The blurring over slowness/angle in Equation (20) arises from the double spatial dependence or observable instability of the aggregate blurring function, which leads to the displayed double slowness dependence on p and p'.

Corresponding Methods for the Offset-Depth (x,z) Domain at Fixed Time t=0

In order to treat (x,z) gathers at constant time, the z dependence may be consolidated. This means that in the mathematical model of the EIG the incident wave at a general depth is expressed in terms of its value at $z_{ref}$, which is then modified by explicit local wave propagators. The effect may be represented as:

$$\tilde{I}(x, x', z, t) = -\frac{\dot{\delta}(t) * \dot{\delta}(t) * \dot{\delta}(t)}{(2\pi)^3} * \qquad (22)$$

$$\int \int \int R(p')i(p)i^{-1}(p') \times \sum_s \tilde{B}^{[\dagger]\dagger}(-p', z_{ref}, -p, z_{ref},$$

$$t + (q + q'')(z - z_{ref}) - 2q'(z_R - z_{ref}) + px) *$$

$$\tilde{D}_2(p', p'', t - p''x') dp dp' dp'',$$

where $D_2$ represents the incident wave combination previously denoted by D as it appears at fixed level $z_{ref}$. Compared to Equation (19), there is now an extra slowness integral, which represents the local propagation in depth of the incident wave away from $z_{ref}$ via the additional vertical slowness that has been incorporated into the receiver-side blurring function in order to consolidate the z dependence. Note that the left-hand side of Equation (22) is still the calibrated data EIG obtained after depth migration, now evaluated at various depths for fixed time.

The slant stack of the (x,z) gather at fixed time may now be stated as $$\tilde{I}(p, x', z, t) = \int S_2(p, p', x', z, z_R, t) R(p') dp' \qquad (23)$$

where $$S_2(p, p', x', z, z_R, t) = \qquad (24)$$

$$\frac{\dot{\delta}(t) * \dot{\delta}(t)}{(2\pi)^2} * \int \frac{i(p(\mu, p'))i^{-1}(p')}{(q + q'')\partial_p \mu} * \sum_s \tilde{B}^{[\dagger]\dagger}(-p', z_{ref},$$

$$-p(\mu, p''), z_{ref}, t - 2q'(z_R - z_{ref}) - (q + q'')z_{ref}) *$$

$$\tilde{D}_2(p', p'', x', t - p''x') dp''$$

is a second type of plane-wave reflection coefficient smearing function. This second type of smearing function is also obtained from the aggregate blurring function and once found may be used to obtain the plane-wave reflection coefficient from the slant stack of the calibrated EIG via Equation (23). This again is a type of deconvolution problem.

Implicit Compensation for Blurring in AVOA

As Equations (19) and (20) are linear in the plane-wave reflection coefficient, the effect of slowness/angle smearing may be incorporated directly into a method of AVOA analysis as an extension of the point-spread function approach. Such an inversion method works directly with the blurred functions and may not use an explicit plane-wave reflection coefficient from which the slowness/angle-domain smearing has first been removed or deconvolved. Thus, in some embodiments, no theoretical obstacles exist to actual AVOA inversion for the material property contrasts from the calibrated EIGs using the blurring formulas presented above. It remains an option to remove the blurring/smearing effect from the calibrated EIG to obtain the explicit reflection operator or reflection coefficients, as described for a particular workflow below.

Explicit Compensation for Blurring in AVOA

In some embodiments, the methods disclosed herein may obtain deblurred reflection coefficients as a function of incidence angle from an EIG, in particular an EIG corresponding to a horizontal reflector. The methods may account for the blurring of reflection coefficients due to practical limitations encountered during acquisition and imperfect illumination.

The reflection coefficients may be obtained via Equation (6). This equation expresses an (x,t) EIG, evaluated at or near the reflector depth, in terms of the reflection operator for the interface. The two objects are connected by the aggregate blurring function $\mathcal{B}$ of Equation (8).

When R corresponds to a horizontal reflector embedded in a simple background, it may be regarded as a function of Δ=x''−x''' (offset) in Equation (7), and the dimensionality of the problem is reduced. Using Δ in Equation (6) or (7) considered at the reflector depth gives $$I(x,x',z,t) = \mathcal{B}(x,x',\Delta + x''',x''',z_R,z_R,t) R(\Delta,t), \qquad (22)$$

where there is integration over x''' as Equations (6) and (7) show. Thus, for a horizontal interface the aggregate blurring function $\mathcal{B}$ has in effect two lateral space dimensions (x, $\Delta$), as x' is considered to be a constant (e.g., the image point at which the reflectivity is to be found). Examples relating to Equation (22) follow in FIGS. 13-17.

Figure 13:
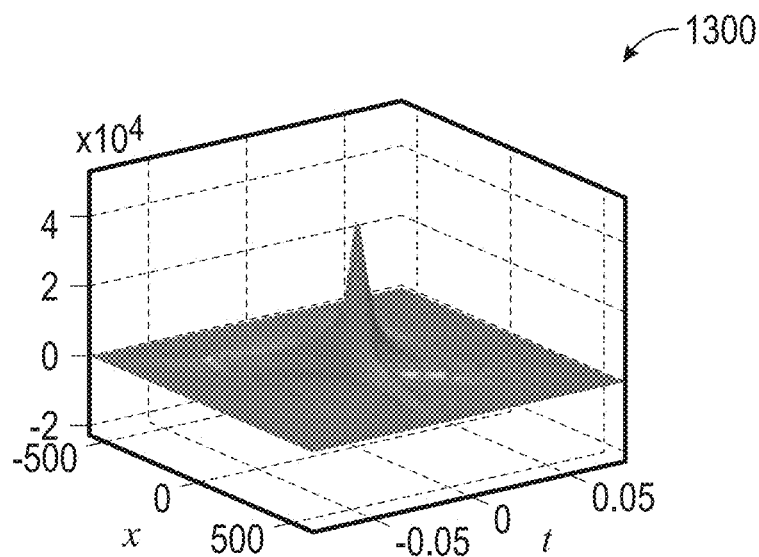
FIGS. 13 and 14 illustrate three-dimensional views of an aggregate blurring function corresponding to a circular salt body in an overburden and a horizontal subsalt reflector, respectively, according to an embodiment.
Figure 14:
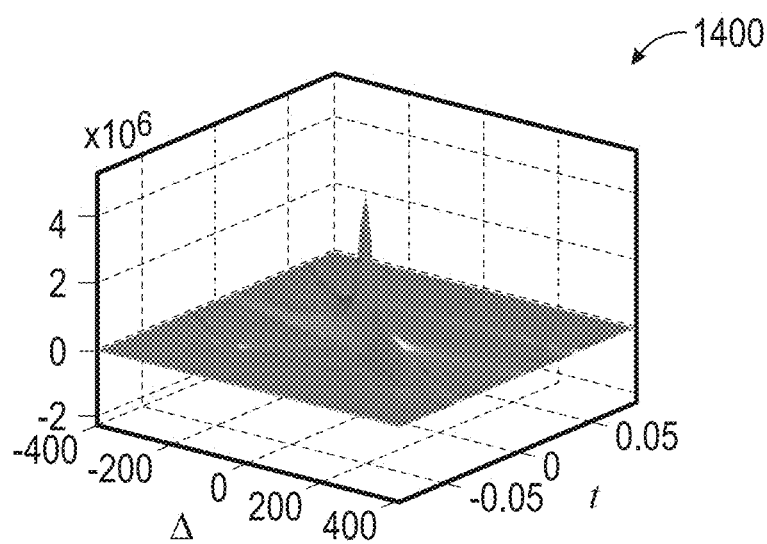

FIG. 13 illustrates a three-dimensional view of an aggregate blurring function 1300 corresponding to a circular salt body in an overburden, and FIG. 14 illustrates a three-dimensional view of an aggregate blurring function 1400 corresponding to a circular salt body in a horizontal subsalt reflector, according to an embodiment. The view in FIG. 13 shows the (x,t) plane, and the view in FIG. 14 shows the ($\Delta$, t) plane.

Figure 15:
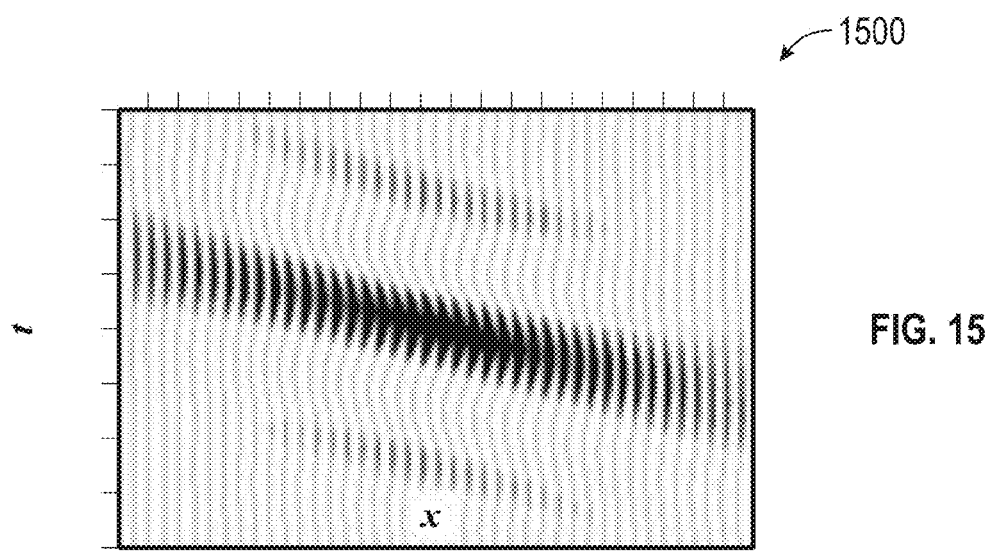
FIG. 15 illustrates an extended image gather for a horizontal interface plotted in the (x,t) plane, according to an embodiment.
Figure 16:
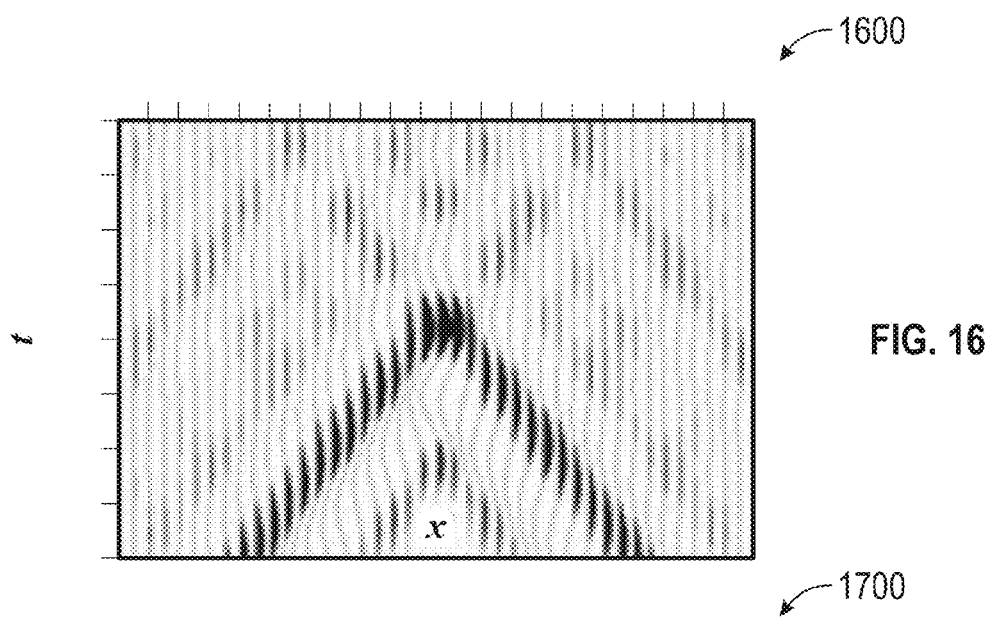
FIG. 16 illustrates a reflection operator for the interface shown in FIG. 15 plotted in the same manner, according to an embodiment.
Figure 17:
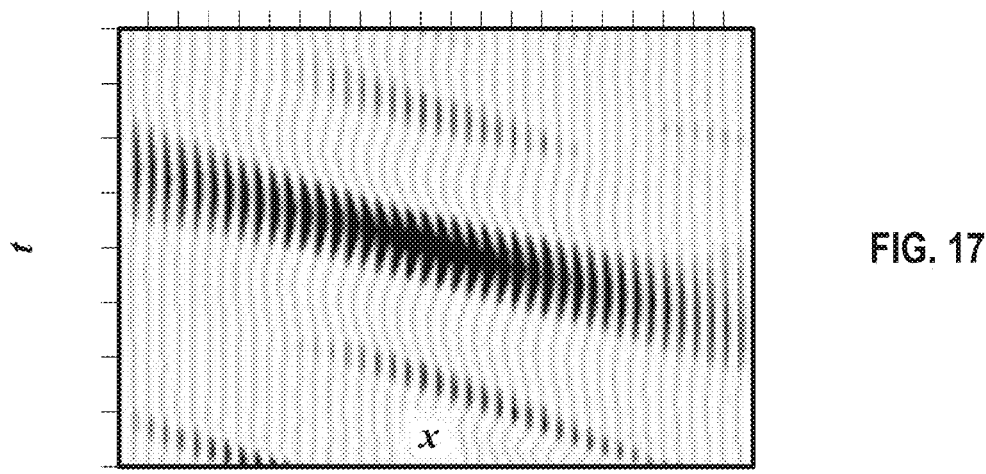
FIG. 17 illustrates a synthetic extended image gather obtained by applying the aggregate blurring function to the reflection operator shown in FIG. 16, according to an embodiment.

FIG. 15 illustrates an extended image gather 1500 for a horizontal interface plotted in the (x,t) plane, according to an embodiment. FIG. 16 illustrates a reflection operator 1600 for the interface shown in FIG. 15 plotted in the same manner, according to an embodiment. FIG. 17 illustrates a synthetic extended image gather 1700 obtained by applying the aggregate blurring function to the reflection operator 1600 shown in FIG. 16, according to an embodiment.

Exploiting the separability of the problem in the frequency domain may reduce the dimensionality further. In the frequency domain, Equation (22) may be replaced by a matrix form in which the rows and columns of the matrix form of $\mathcal{B}$ are indexed by (x, $\Delta$) samples. Solving these discrete equations for R($\Delta$, $\omega$) and then discrete Fourier transforming with respect to $\Delta$ gives the frequency-spatial wavenumber domain form R(k, $\omega$). It may then be possible to extract radial lines from the (k, $\omega$,) plane, obtaining plane-wave reflection coefficients for slowness p. These plane-wave reflection coefficients may then be taken as input to AVOA analysis. It remains an option to perform AVOA without explicitly removing the blurring function to obtain the deblurred reflection operator or reflection coefficients, as described in the previous section on implicit compensation for blurring.

The reflector may be dipping with respect to the grid on which the wavefields are sampled and the EIG is defined. The aggregate blurring function may be unchanged, but the reflection operator in Equation (7) no longer simplifies from R(x'', x''', t) to R($\Delta$, t). The dipping-interface reflection operator still embodies Snell's law and, while an additional slant stack of the aggregate blurring function becomes involved, the smearing of plane-wave reflection coefficients over slowness/angle may still be quantified using the methodology. Once more the method may be applied in the (x,t) at constant depth or the (x,z) plane at fixed t, and the option exists to perform operations in the frequency domain.

The aggregate blurring function may be controlled by the overburden structure and acquisition parameters, whereas the reflection operator may be local to the target reflector. The spatial variability of the aggregate blurring function may define the extent of blurring over slowness/angle of plane-wave reflection coefficients in the reflection operator. The terms stable and unstable may be used to characterize the nature of the aggregate blurring function, with the latter implying more slowness/angle blurring.

The modelling may use a finite-difference method or a ray-based method. As long as the EIG is calibrated for the smoothing inherent in the receiver-side blurring function, the manner in which the EIG is transformed into the slowness/angle domain may vary. Methods such as Radon transform, Fourier transform, or source-direction gathers may be used in principle.

The method is not limited to a two-dimensional (x,z) world. The aggregate blurring function and the reflection operator may be defined similarly in a three-dimensional world, and their relationship remains unchanged.

The decision where to fire the shots and/or place the receivers for data acquisition may be aided by computing approximate aggregate blurring functions and slowness/angle domain smearing functions for an approximate trial model of the subsurface constructed before the field work. These functions may be used in the process of seismic survey design, where the aim is to find shot and receiver positions that optimize the subsurface illumination. This may mean optimizing extended image gathers for AVOA, but it may also be simply interpreted to mean optimal illumination for the final stacked image. The method for quantifying slowness/angle domain smearing brings a new tool to survey design. For example, source-side wavefields and receiver-side blurring functions may be displayed to quality control the survey geometry and illumination.

Figure 18A:
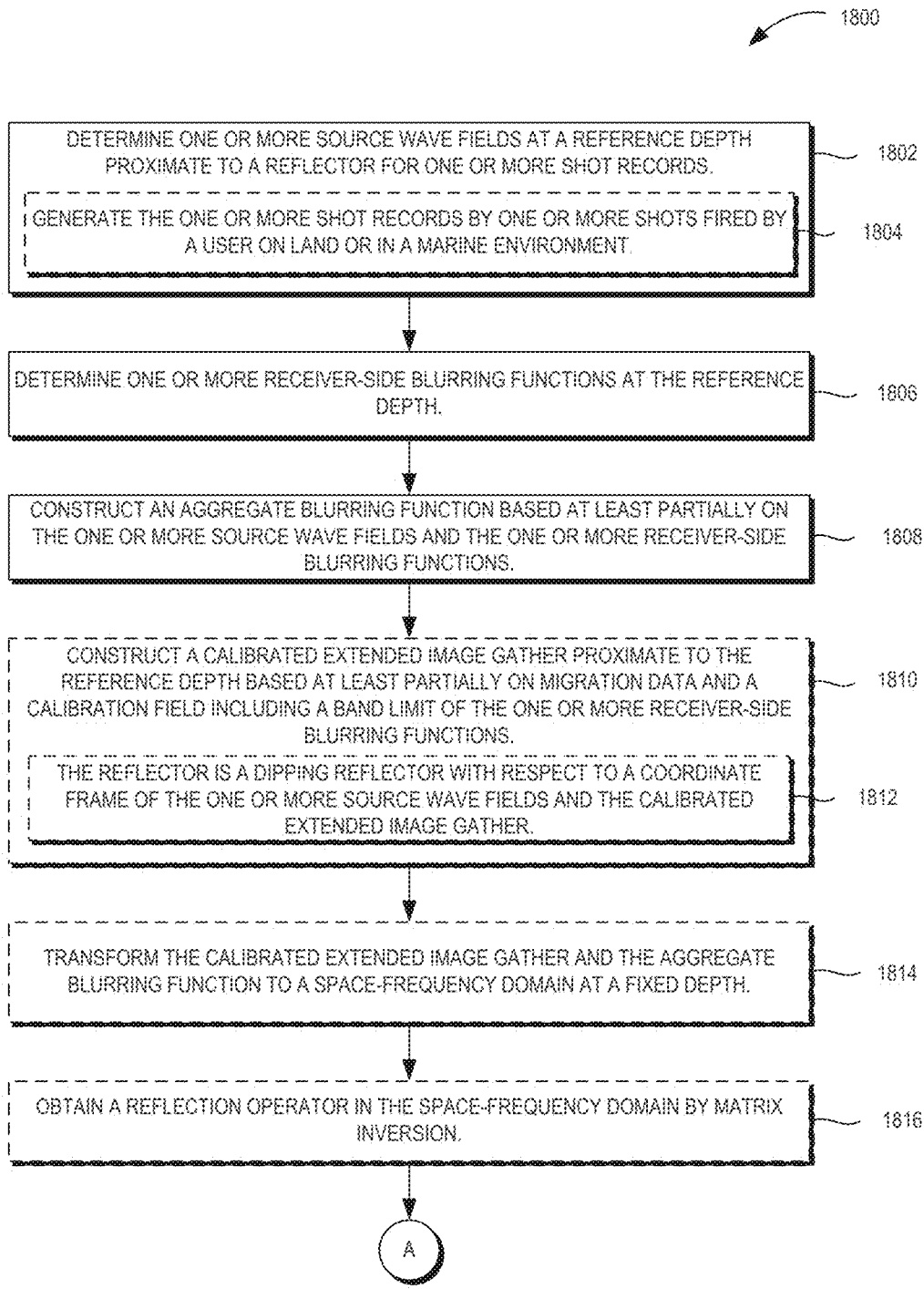
FIGS. 18A-C illustrate a flowchart of a method for determining a reflection coefficient, according to an embodiment.
Figure 18B:
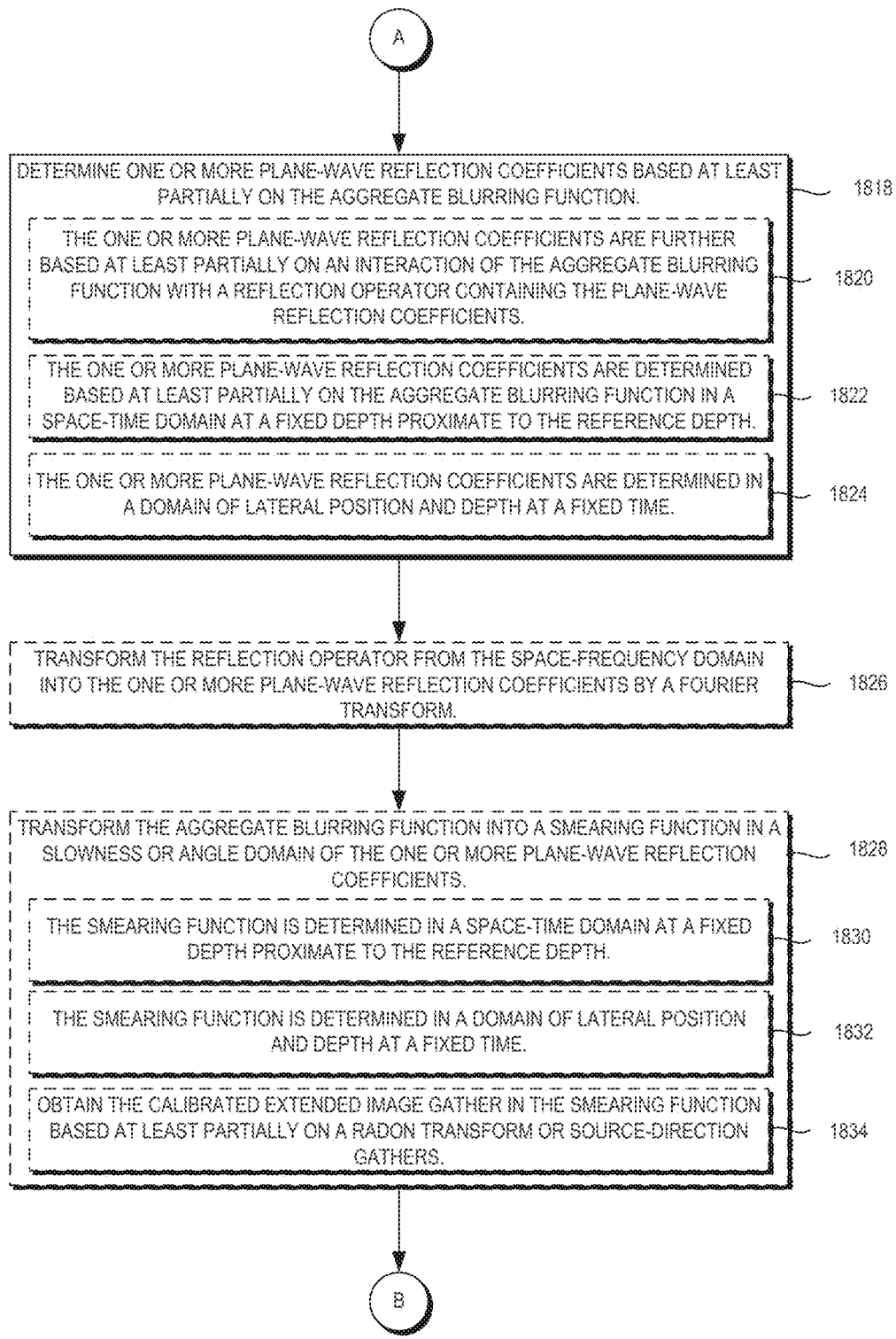
Figure 18C:
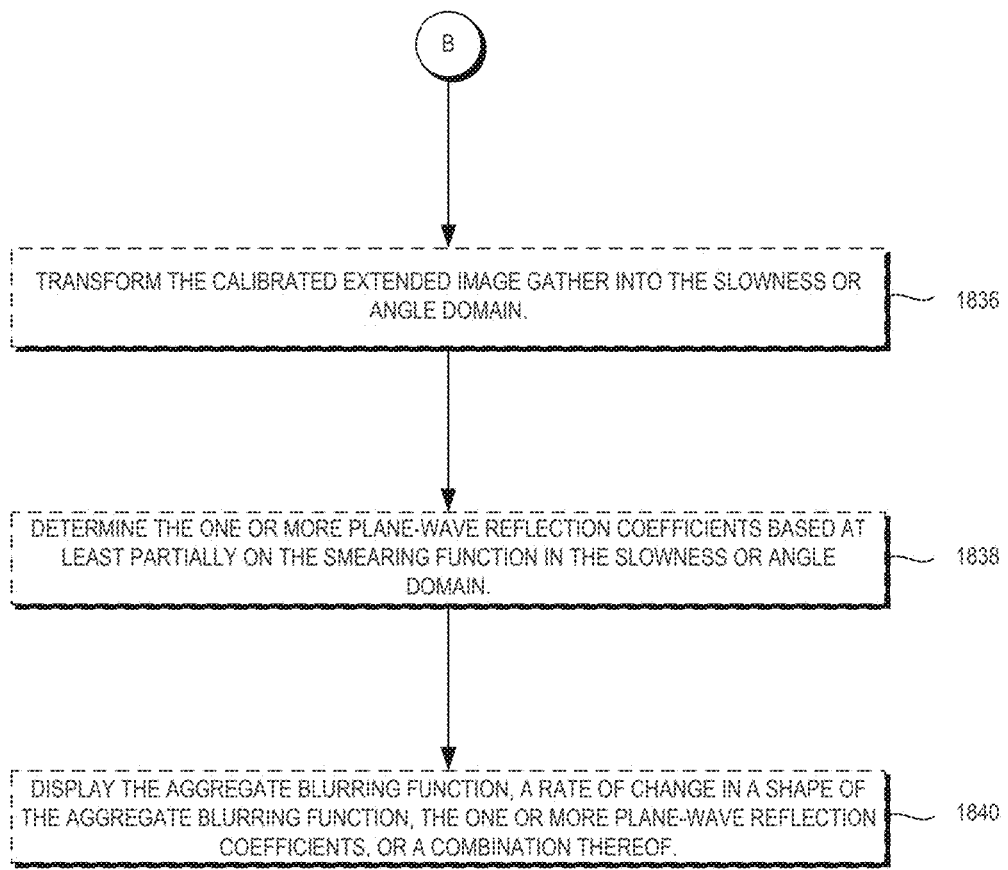

Attention is now directed to FIGS. 18A-C, which are flow diagrams illustrating a method 1800 for determining a reflection coefficient, according to an embodiment. Some operations in the method 1800 may be combined and/or the order of some operations may be changed. Further, some operations in the method 1800 may be combined with aspects of the example workflows of FIGS. 4 and 5, and/or the order of some operations in methods 400 and/or 500 may be changed to account for incorporation of aspects of the workflow illustrated by one or more of FIGS. 4 and 5.

The method 1800 may include determining one or more source wave fields at a reference depth proximate to a reflector for one or more shot records, as at 1802 (e.g., FIG. 5, 504; one or more source wave fields are determined). In an embodiment, the one or more shot records are generated by one or more shots fired by a user on land or in a marine environment, as at 1804 (e.g., FIG. 5, 504; the shot records are generated by one or more shots fired by a user).

The method 1800 may also include determining one or more receiver-side blurring functions at the reference depth, as at 1806 (e.g., FIG. 5, 508; one or more receiver-side blurring functions are determined proximate to the image point at the reference depth). The method 1800 may also include constructing an aggregate blurring function based at least partially on the one or more source wave fields and the one or more receiver-side blurring functions, as at 1808 (e.g., FIG. 5; 512; an aggregate blurring function is constructed based at least partially on the one or more source wave fields and the one or more receiver-side blurring functions).

The method 1800 may also include constructing a calibrated extended image gather proximate to the reference depth based at least partially on migration data and a calibration field including a band limit of the one or more receiver-side blurring functions, as at 1810 (e.g., FIG. 5, 516; an extended image gather is constructed based at least partially on the migration data). The reflector may be a dipping reflector with respect to a coordinate frame of the one or more source wave fields and the calibrated extended image gather, as at 1812 (e.g., FIG. 5, 516; the reflector may be a dipping reflector).

The method 1800 may also include transforming the calibrated extended image gather and the aggregate blurring function to a space-frequency domain at a fixed depth, as at 1814 (e.g., FIG. 5, 518; the extended image gather may be transformed into the frequency domain). The method 1800 may also include obtaining a reflection operator in the space-frequency domain by matrix inversion, as at 1816

(e.g., FIG. 5, 518; a reflection operator may be obtained in the space-frequency domain).

The method 1800 may also include determining one or more plane-wave reflection coefficients based at least partially on the aggregate blurring function, as at 1818 (e.g., FIG. 5, 522; one or more reflection operators may be determined). The one or more plane-wave reflection coefficients may be at least partially based on an interaction of the aggregate blurring function with a reflection operator containing the plane-wave reflection coefficients, as at 1820 (e.g., FIG. 5, 522; the one or more plane-wave reflection coefficients may be at least partially based on an interaction of the aggregate blurring function with a reflection operator containing the plane-wave reflection coefficients). The one or more plane-wave reflection coefficients may be determined based at least partially on the aggregate blurring function in a space-time domain at a fixed depth proximate to the reference depth, as at 1822 (e.g., FIG. 5, 522; the one or more plane-wave reflection coefficients may be determined based at least partially on the aggregate blurring function in a space-time domain). The one or more plane-wave reflection coefficients may be determined in a domain of lateral position and depth at a fixed time, as at 1824 (e.g., FIG. 5, 522; the one or more plane-wave reflection coefficients may be determined in a domain of lateral position and depth at a fixed time).

The method 1800 may also include transforming the reflection operator from the space-frequency domain into the one or more plane-wave reflection coefficients by a Fourier transform, as at 1826 (e.g., FIG. 5, 522; the reflection operator may be transformed from the space-frequency domain into the one or more plane-wave reflection coefficients). The method 1800 may also include transforming the aggregate blurring function into a smearing function in a slowness or angle domain of the one or more plane-wave reflection coefficients, as at 1828 (e.g., FIG. 5, 524; the one or more reflection operators may be transformed into a slowness and/or angle domain). The smearing function may be determined in a space-time domain at a fixed depth proximate to the reference depth, as at 1830 (e.g., FIG. 5, 524; the smearing function may be determined in a space-time domain at a fixed depth proximate to the reference depth). The smearing function may be determined in a domain of lateral position and depth at a fixed time, as at 1832 (e.g., FIG. 5, 524; the smearing function may be determined in a domain of lateral position and depth at a fixed time). The calibrated extended image gather in the smearing function may be obtained based at least partially on a Radon transform or source-direction gathers, as at 1834 (e.g., FIG. 5, 524; the calibrated extended image gather in the smearing function may be obtained based at least partially on a Radon transform or source-direction gathers).

The method 1800 may also include transforming the calibrated extended image gather into the slowness or angle domain, as at 1836 (e.g., FIG. 5, 524; the one or more reflection operators may be transformed into the slowness and/or angle domain). The method 1800 may also include determining the one or more plane-wave reflection coefficients based at least partially on the smearing function in the slowness or angle domain, as at 1838 (e.g., FIG. 5, 524; the one or more plane-wave reflection coefficients may be determined based at least partially on the smearing function in the slowness or angle domain). The method 1800 may also include displaying the aggregate blurring function, a rate of change in a shape of the aggregate blurring function, the one or more plane-wave reflection coefficients, or a combination thereof, as at 1840 (e.g., FIG. 5, 524; displaying a portion of the method 1800).

In some embodiments, the methods 400, 500, and 1800 may be executed by a computing system. FIG. 19 illustrates an example of such a computing system 1900, in accordance with some embodiments. The computing system 1900 may include a computer or computer system 1901A, which may be an individual computer system 1901A or an arrangement of distributed computer systems. The computer system 1901A includes one or more analysis modules 1902 that are configured to perform various tasks according to some embodiments, such as one or more methods disclosed herein (e.g., methods 400, 500, 1800, and/or combinations and/or variations thereof). To perform these various tasks, the analysis module 1902 executes independently, or in coordination with, one or more processors 1904, which is (or are) connected to one or more storage media 1906. The processor(s) 1904 is (or are) also connected to a network interface 1907 to allow the computer system 1901A to communicate over a data network 1909 with one or more additional computer systems and/or computing systems, such as 1901B, 1901C, and/or 1901D (note that computer systems 1901B, 1901C and/or 1901D may or may not share the same architecture as computer system 1901A, and may be located in different physical locations, e.g., computer systems 1901A and 1901B may be located in a processing facility, while in communication with one or more computer systems such as 1901C and/or 1901D that are located in one or more data centers, and/or located in varying countries on different continents).

A processor can include a microprocessor, microcontroller, processor module or subsystem, programmable integrated circuit, programmable gate array, or another control or computing device.

The storage media 1906 can be implemented as one or more computer-readable or machine-readable storage media. Note that while in the example embodiment of FIG. 19 storage media 1906 is depicted as within computer system 1901A, in some embodiments, storage media 1906 may be distributed within and/or across multiple internal and/or external enclosures of computing system 1901A and/or additional computing systems. Storage media 1906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or in another embodiment, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1900 contains one or more compensation module(s) 1908. In the example of computing system 1900, computer system 1901A includes the compensation module 1908. In some embodiments, a single compensation module may be used to perform some or all aspects of one or more embodiments of the methods 400, 500, 1800. In another embodiment, a plurality of compensation modules may be used to perform some or all aspects of methods 400, 500, 1800.

It should be appreciated that computing system 1900 is one example of a computing system, and that computing system 1900 may have more or fewer components than shown, may combine additional components not depicted in the example embodiment of FIG. 19, and/or computing system 1900 may have a different configuration or arrangement of the components depicted in FIG. 19. The various components shown in FIG. 19 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to methods 400, 500, 1800 as discussed herein. This can include use of feedback loops executed on an algorithmic basis, such as at a computing device (e.g., computing system 1900, FIG. 19), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods 400, 500, 1800 are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for compensating for spatial and slowness or angle blurring of plane-wave reflection coefficients in imaging, comprising:
   determining one or more source wave fields at a reference depth proximate to a reflector for one or more shot records;
   determining one or more receiver-side blurring functions at the reference depth;
   constructing an aggregate blurring function based at least partially on the one or more source wave fields and the one or more receiver-side blurring functions; and
   determining, using a processor, one or more plane-wave reflection coefficients based at least partially on the aggregate blurring function.

2. The method of claim 1, wherein the one or more plane-wave reflection coefficients are further based at least partially on an interaction of the aggregate blurring function with a reflection operator containing the plane-wave reflection coefficients.

3. The method of claim 1, wherein the one or more plane-wave reflection coefficients are determined based at least partially on the aggregate blurring function in a space-time domain at a fixed depth proximate to the reference depth.

4. The method of claim 1, wherein the one or more plane-wave reflection coefficients are determined in a domain of lateral position and depth at a fixed time.

5. The method of claim 1, further comprising constructing a calibrated extended image gather proximate to the reference depth based at least partially on migration data and a calibration field comprising a band limit of the one or more receiver-side blurring functions.

6. The method of claim 5, wherein the reflector is a dipping reflector with respect to a coordinate frame of the one or more source wave fields and the calibrated extended image gather.

7. The method of claim 6, further comprising:
   transforming the calibrated extended image gather and the aggregate blurring function to a space-frequency domain at a fixed depth; and
   obtaining a reflection operator in the space-frequency domain by matrix inversion.

8. The method of claim 7, further comprising transforming the reflection operator from the space-frequency domain into the one or more plane-wave reflection coefficients by a Fourier transform.

9. The method of claim 5, further comprising transforming the aggregate blurring function into a smearing function in a slowness or angle domain of the one or more plane-wave reflection coefficients.

10. The method of claim 9, wherein the smearing function in the slowness or angle domain is determined in a space-time domain at a fixed depth proximate to the reference depth.

11. The method of claim 9, wherein the smearing function in the slowness or angle domain is determined in a domain of lateral position and depth at a fixed time.

12. The method of claim 9, further comprising:
   transforming the calibrated extended image gather into the slowness or angle domain; and
   determining the one or more plane-wave reflection coefficients based at least partially on the smearing function in the slowness or angle domain.

13. The method of claim 12, further comprising obtaining the calibrated extended image gather in the smearing function in the slowness or angle domain with a Radon transform or source-direction gathers.

14. The method of claim 1, further comprising displaying the aggregate blurring function, a rate of change in a shape of the aggregate blurring function, the one or more plane-wave reflection coefficients, or a combination thereof.

15. The method of claim 1, wherein the one or more shot records are generated by one or more shots fired by a user on land or in a marine environment.

16. A non-transitory computer-readable medium storing instructions that, when executed by at least one processor of a computing system, cause the computing system to perform operations, the operations comprising:

determining one or more source wave fields at a reference depth proximate to a reflector for one or more shot records;

determining one or more receiver-side blurring functions at the reference depth;

constructing an aggregate blurring function based at least partially on the one or more source wave fields and the one or more receiver-side blurring functions; and determining, using the at least one processor, one or more plane-wave reflection coefficients based at least partially on the aggregate blurring function.

17. The non-transitory computer-readable medium of claim 16, wherein the one or more plane-wave reflection coefficients are further based at least partially on an interaction of the aggregate blurring function with a reflection operator containing the plane-wave reflection coefficients.

18. The non-transitory computer-readable medium of claim 16, wherein the one or more plane-wave reflection coefficients are determined based at least partially on the aggregate blurring function in a space-time domain at a fixed depth proximate to the reference depth.

19. The non-transitory computer-readable medium of claim 16, further comprising constructing a calibrated extended image gather proximate to the reference depth based at least partially on migration data and a calibration field comprising a band limit of the one or more receiver-side blurring functions.

20. A computing system, comprising:

one or more processors; and a memory system comprising one or more non-transitory, computer-readable media comprising instructions that, when executed by at least one of the one or more processors, cause the computing system to perform operations, the operations comprising:

determining one or more source wave fields at a reference depth proximate to a reflector for one or more shot records;

determining one or more receiver-side blurring functions at the reference depth;

constructing an aggregate blurring function based at least partially on the one or more source wave fields and the one or more receiver-side blurring functions; and determining, using the one or more processors, one or more plane-wave reflection coefficients based at least partially on the aggregate blurring function.

\* \* \* \* \*